(12) United States Patent
Saville et al.

(10) Patent No.: US 8,128,119 B2
(45) Date of Patent: Mar. 6, 2012

(54) STROLLER WITH FOLDABLE FRAME AND ADJUSTABLE HANDLE

(75) Inventors: Derek Saville, Stockton, CA (US); Daniel Newhard, Lititz, PA (US); Nico Michler, Baden-Württemberg (DE); Christian Busse, Munich (DE); Bianca Fleischer, Santa Monica, CA (US)

(73) Assignee: Graco Children's Products Inc., Atlanta, GA (US)

( * ) Notice: Subject to any disclaimer, the term of this patent is extended or adjusted under 35 U.S.C. 154(b) by 619 days.

(21) Appl. No.: 11/831,430

(22) Filed: Jul. 31, 2007

(65) Prior Publication Data

US 2009/0033066 A1    Feb. 5, 2009

(51) Int. Cl.
   *B62B 7/06* (2006.01)
(52) U.S. Cl. .......................... 280/648; 280/650
(58) Field of Classification Search .......... 180/642, 180/647, 648, 650, 657, 658, 47.38, 47.39, 180/47.4
   See application file for complete search history.

(56) References Cited

U.S. PATENT DOCUMENTS

| | | | | |
|---|---|---|---|---|
| 3,930,663 | A | * | 1/1976 | Scripter ........................ 280/654 |
| 4,180,276 | A | * | 12/1979 | Kassai ........................ 280/47.36 |
| 5,056,805 | A | * | 10/1991 | Wang ........................ 280/47.36 |
| 5,301,970 | A | | 4/1994 | Haskins |
| 5,601,302 | A | | 2/1997 | Beard et al. |
| 5,709,400 | A | | 1/1998 | Bonnier et al. |
| 5,845,924 | A | | 12/1998 | Huang |
| 6,099,022 | A | | 8/2000 | Pring |
| 6,102,431 | A | * | 8/2000 | Sutherland et al. ........... 280/642 |
| 6,193,263 | B1 | | 2/2001 | Lin |
| 6,203,054 | B1 | | 3/2001 | Matsumoto |
| 6,209,892 | B1 | | 4/2001 | Schaaf et al. |
| 6,220,621 | B1 | * | 4/2001 | Newton ........................ 280/650 |
| 6,357,784 | B1 | * | 3/2002 | Mitzman ....................... 280/642 |
| 6,398,233 | B1 | | 6/2002 | Liang et al. |
| 6,446,990 | B1 | | 9/2002 | Nania et al. |
| 6,513,827 | B1 | * | 2/2003 | Barenbrug ..................... 280/648 |
| 6,540,250 | B1 | | 4/2003 | Peterson |

(Continued)

FOREIGN PATENT DOCUMENTS

DE    202006012430    11/2006

(Continued)

OTHER PUBLICATIONS

Britax Preview Lightweight Umbrella Travel System (Jun. 2004).

(Continued)

*Primary Examiner* — Frank Vanaman
(74) *Attorney, Agent, or Firm* — Lempia Summerfield Katz LLC

(57) ABSTRACT

A stroller includes a frame having a frame leg and a frame joint at which the frame leg is coupled to the frame. The frame joint is configured to allow retraction of the frame leg to a folded position. A handle is attached to the frame at a pivot joint, the pivot joint being configured for rotation of the handle between first and second operational orientations. The pivot joint is further configured for rotation of the handle from the first or second operational orientations to a storage position aligned with the folded position of the frame leg. In some cases, a front frame leg and a rear frame leg are coupled to the frame joint, the frame joint being configured to allow the front frame leg and the rear frame leg to retract to respective folded positions in which the stroller is supported in an upright orientation.

27 Claims, 17 Drawing Sheets

U.S. PATENT DOCUMENTS

| | | | |
|---|---|---|---|
| 6,715,783 B1 | 4/2004 | Hanson et al. | |
| 6,991,248 B2 * | 1/2006 | Valdez et al. | 280/647 |
| 7,374,196 B2 * | 5/2008 | Hartenstine et al. | 280/642 |
| 2006/0001226 A1 | 1/2006 | Refsum | |
| 2007/0045975 A1 | 3/2007 | Yang | |
| 2007/0096434 A1 * | 5/2007 | Haeggberg | 280/642 |

FOREIGN PATENT DOCUMENTS

| | | |
|---|---|---|
| EP | 1 992 543 | 8/2006 |
| FR | 2 648 102 | 12/1990 |
| JP | 64-4567 * | 1/1989 |
| WO | WO 96/22907 | 8/1996 |
| WO | WO 01/32493 | 5/2001 |

OTHER PUBLICATIONS

Stokke Product Guide featuring Stokke Xplory stroller, 7 pages (Fall 2006).

Great Britain Search Report issued in Great Britain Application No. 0911254.1 mailed Oct. 13, 2009.

Great Britain Search Report issued in Great Britain Application No. 0911254.1 mailed Dec. 16, 2009.

* cited by examiner

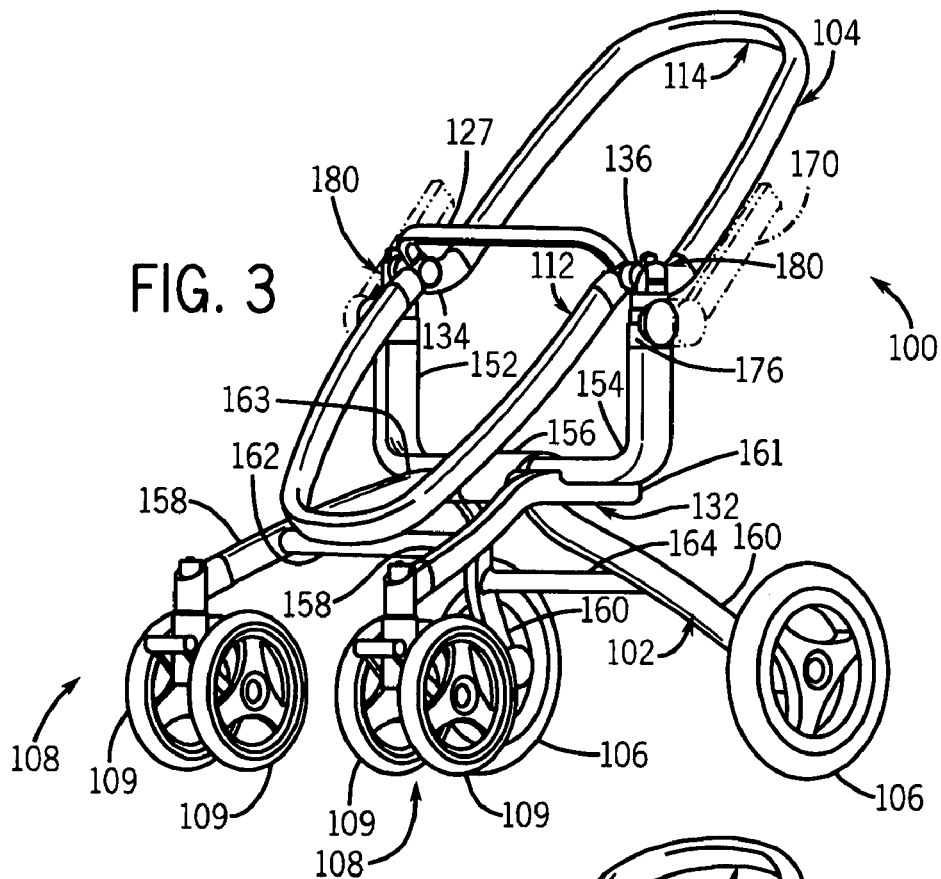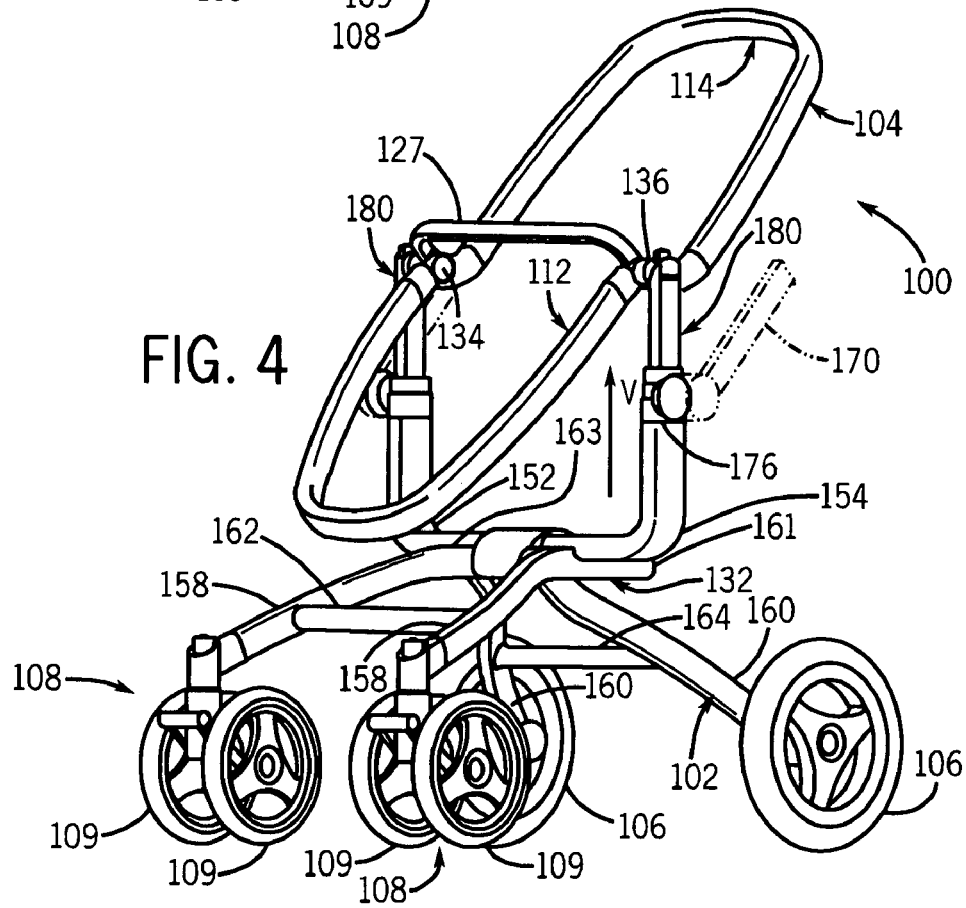

STROLLER WITH FOLDABLE FRAME AND ADJUSTABLE HANDLE

BACKGROUND OF THE INVENTION

1. Field of the Disclosure

The present disclosure is generally directed to strollers, and more particularly to strollers having a foldable frame and an adjustable handle.

2. Description of Related Art

Strollers are usually capable of re-configuration and other adjustments after assembly. Most strollers can adapt from an in-use configuration to a folded configuration for purposes of storage, transport, etc. Folding arrangements and other adjustments have often involved adjustable connectors, brackets and other links between frame sections. Using the adjustable links, re-configuration of the stroller can be accomplished without disassembling the stroller. Other adjustments have involved reclining seat backs, removable or replaceable occupant trays, and adjustable foot rests.

Many strollers have a folded configuration in which the frame is disposed in a flattened position. From the in-use configuration, these strollers fold downward toward the flattened position. Unfortunately, the resulting configuration can be considerably lower and, thus, inconvenient for further handling by a caregiver. Heavier strollers can then be difficult to pick up from the flattened position. Strollers that fold in this fashion may also remain unsuitably bulky, retaining most, if not all, of their length and width. For these reasons, caregivers may find it inconvenient to stow the stroller in a vehicle or other storage location.

Umbrella strollers are often an alternative favored by caregivers faced with limited storage space or the need for portability after folding. Umbrella strollers are generally more compact both before and after folding due in large part to simpler designs. These designs also lead to a more lightweight stroller more suitable for carrying while in the folded position. For this reason, umbrella strollers are often equipped with handles having curved (e.g., J-shaped) ends for carrying the stroller after folding. Unfortunately, the simpler designs of umbrella strollers lead to limited feature sets that provide minimal, if any, opportunities for customization and other adjustments during use.

BRIEF DESCRIPTION OF THE DRAWINGS

Objects, features, and advantages of the present invention will become apparent upon reading the following description in conjunction with the drawing figures, in which:

FIG. 3 is a front, perspective view of a portion of the stroller of FIG. 1 showing the seat assembly positioned at a lowered height level.

FIG. 4 is a front, perspective view of a portion of the stroller of FIG. 1 showing the seat assembly positioned at a raised height level.

DETAILED DESCRIPTION OF THE DISCLOSURE

Figure 1:
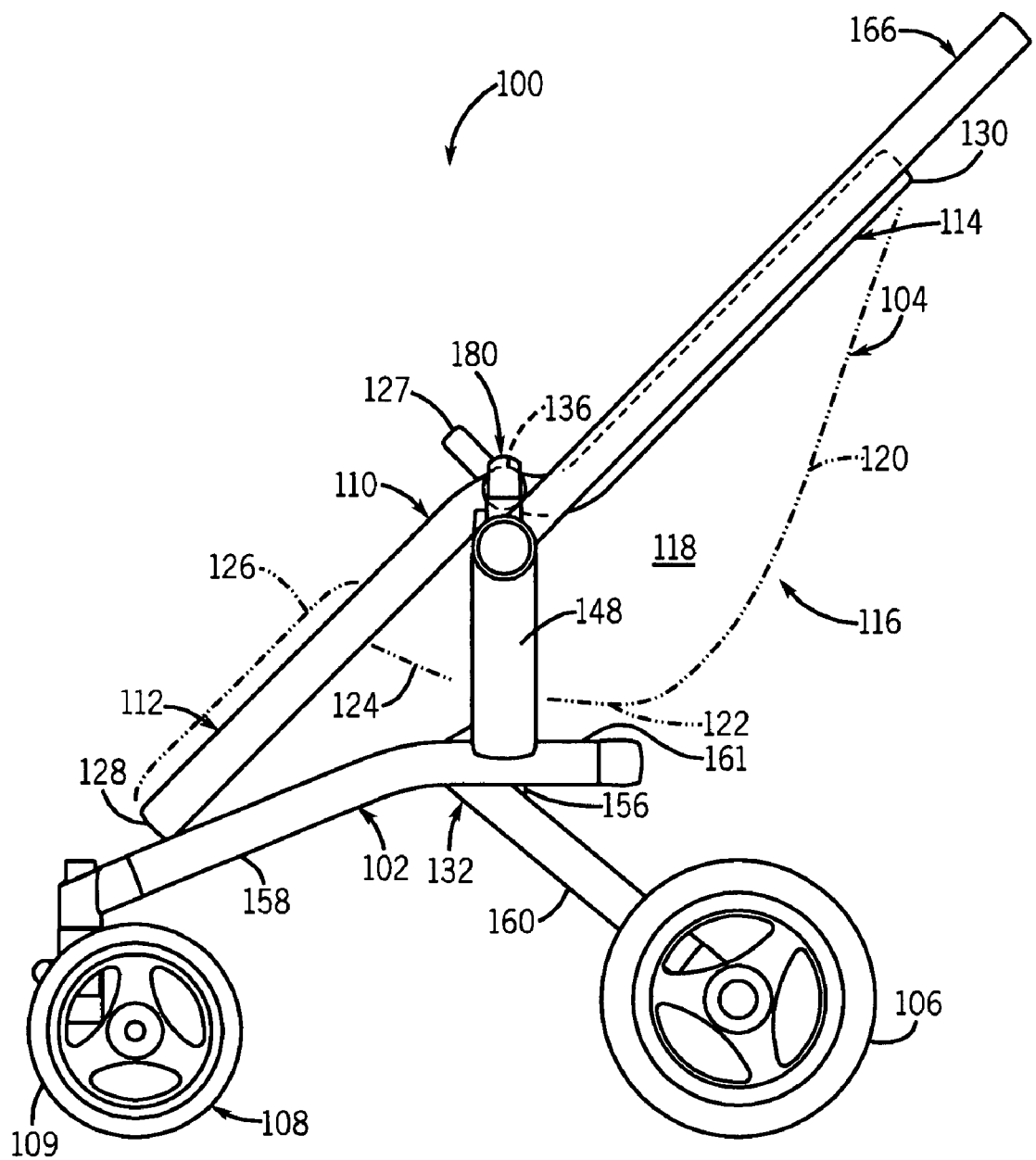
FIG. 1 is a side, elevational view of an exemplary stroller having a height-adjustable seat assembly.

The disclosure is generally directed to strollers having a foldable frame and adjustable handle. The folding of the frame generally involves inward retraction of frame components into a compact, upright arrangement. In some cases, the upright arrangement positions the stroller frame over the stroller wheels such that the stroller is supported by the wheels after folding. As a result, the stroller can be placed in a standing orientation while folded in the upright arrangement.

In accordance with one aspect of the disclosure, adjustment of the handle position provides a caregiver with the option of maneuvering the stroller in either direction. To this end, the handle can be disposed in one or more forward, in-use positions or one or more rearward, in-use positions. The handle can be further adjusted downward from either in-use position to facilitate an inward retraction of the stroller toward one or more folded positions. The inward retraction results in a folded orientation that is compact and conveniently upright, despite a wide complement of features, including a number of options or adjustments involving the stroller seating, as described herein.

These and other features, aspects and advantages of the disclosed strollers will become apparent upon a review of the attached drawing figures and the detailed description below.

Turning now to the drawings, an exemplary stroller is generally depicted at 100 in FIGS. 1-4 and is constructed in accordance with the teachings of the present invention. In this example, the stroller 100 generally has a frame assembly 102, a seat assembly 104 (FIG. 1) supported by the frame assembly 102, and a plurality of wheels supporting the frame assembly 102 on a ground surface. The frame assembly 102 in the disclosed example includes a pair of rear wheels 106 and a pair of front wheel assemblies indicated generally at 108. In this example, each front wheel assembly 108 has two wheels 109 spaced apart side by side. The configuration and construction of the front wheel assemblies 108 and the rear wheels 106 can vary considerably and yet fall within the spirit and scope of the present invention.

The frame assembly 102 generally has a seat mounting frame 110 configured for compatibility with a variety of seat assemblies or other seating components. To that end, some, if not all, of the seat assembly 104 may be removable from the seat frame 110 and the stroller 100. For example, a car seat carrier (not shown) may then engage the seat frame 110 to accommodate an infant child occupant. In these and other cases, the seat mounting frame 110 may be considered an integral or other component of the frame assembly 102. However, the seat mounting frame 110 may also be considered a part or portion of the seat assembly 104, such as when one or more other units of the seat assembly 104 are integrally formed with the seat mounting frame 110 or otherwise not removable from the seat mounting frame 110. More generally, the seat mounting frame 110 may alternatively be considered a component shared by both the frame assembly 102 and the seat assembly 104.

In this exemplary case, one or more components of the seat assembly 104 are supported by a pair of U-shaped components of the seat frame 110. More specifically, the U-shaped components correspond with a lower, front seat attachment tube 112 and an upper, rear seat attachment tube 114. Both of the seat attachment tubes 112, 114 have elongate sides integrally formed with arch-shaped ends, collectively defining upper and lower U-shaped support structures. Each seat attachment tube 112, 114, in turn, defines a respective area in which portions of the seat assembly 104 are positioned or suspended. For example, as best shown in FIG. 1, a seat indicated generally at 116 and shown in phantom may include side panels or wings 118 and a seat back or backrest 120 suspended from the seat attachment tube 114. The side panels 118 and the backrest 120 may extend downward toward, and connect with, a seat bottom 122 of the seat 116. The seat bottom 122 may also be suspended from, or supported by, the seat attachment tube 112 at a front end 124 of the seat bottom 122. The seat assembly 104 may also include a leg rest portion 126 disposed within the arch defined by the seat attachment tube 112. An occupant tray bar 127 may cross the seat assembly 104 at a position above the leg rest portion 126 and forward of the backrest 120. Apart from supporting an occupant tray (not shown), the bar 127 may help retain the seat occupant in the seat 116 and be used for other purposes (e.g., an occupant arm rest, or infant carrier attachment). Optional components of the seat assembly 104 include a foot rest (not shown) connected to the seat mounting frame 110 at or near a lower end 128 of the seat attachment tube 112, as well as a canopy (not shown) connected to the seat mounting frame 110 at or near an upper end 130 of the seat attachment tube 114.

Any one or more of the above-referenced parts of the seat 116 can be made entirely of fabric or like materials and include components directed to facilitating attachment to, or suspension from, the seat frame 110. Alternatively or additionally, portions of the seat assembly 116 may include a cover material, which may be removable, and placed over a generally rigid supporting structure that defines and shapes the portion of the seat, such as the seat bottom 122 or the seat side wings 118. Thus, once attached to the seat frame 110, the seat assembly 104 can be sufficiently supported on the stroller 100 and substantial enough to support the weight of a child occupant. More generally, the configuration and construction of the seat 116 and other portions of the seat assembly 104 can vary considerably and yet fall within the spirit and scope of the present invention.

The lower and upper seat attachment tubes 112 and 114 are attached to a base portion or chassis 132 of the frame assembly 102 at a pair of rotational or pivotal seat joints 134 and 136. More specifically, side rails or arms 138 and 140 of the lower seat attachment tube 112 extend rearward and upward from the lower end 128 to terminate at the seat joints 134 and 136, respectively. Similarly, side rails or arms 142 and 144 of the upper seat attachment tube 114 extend downward and forward from the upper end 130 to terminate at the seat joints 134 and 136, respectively. In this exemplary case, the lower and upper seat attachment tubes 112 and 114 are separately coupled to the seat joints 134 and 136 to enable independent rotation of the lower and upper seat attachment tubes 112 and 114. In other cases, the lower and upper seat attachment tubes 112 and 114 may be integrally formed or otherwise fixedly attached to one another. The seat joints 134 and 136 are positioned on horizontal pivot axes M1 and M2 (FIG. 2) that extend horizontally along a transverse line disposed between the front and rear wheels 106, 109. The seat joints 134 and 136 generally allow the inclination or declination of the components of the seat assembly 104 to be adjusted relative to the base frame or chassis 132, which, in contrast, generally includes a set of structural components in fixed relation to each other during use in operational configurations. Each end of the occupant tray bar 127 may also be coupled to the frame assembly 102 at or near the seat joints 134, 136.

In the exemplary embodiment shown in FIGS. 1-4, the chassis 132 and, more generally, the frame assembly 102 includes a pair of upstanding frame posts 146 and 148 that extend upward to the seat joints 134 and 136, respectively. In this manner, the frame posts 146 and 148 couple the seat frame 110 (and, by extension, the seat assembly 104) to the remainder of the frame assembly 102 (and, by extension, the non-seating portions of the stroller 100) at a position, or level, above the chassis 132. Each post 146, 148 may have a tubular cross-section and, for example, be formed from extruded aluminum or any other materials) providing sufficient structural support. The posts 146 and 148 are connected by a cross member or brace 150 (FIGS. 2-4) of the chassis 132 that may, but need not, be integrally formed with the posts 146, 148, as shown. The brace 150 extends horizontally on a line parallel with the pivot axes M1 and M2 and may include ends 152 and 154 that are bent upward to meet the posts 146, 148. In this exemplary case, the brace 150 and the posts 146, 148 form a U-shaped support structure extending upward from other portions of the base frame or chassis 132 to interface with the seat frame 110 and other seating components of the stroller 100.

The frame assembly 102 further includes a bracket 156 to couple the brace 150 to a pair of front legs 158 and a pair of rear legs 160 of the chassis 132. In alternative embodiments, a clamp or other connector may be utilized to couple the brace 150 to the front and rear legs 158 and 160. The brace 150 need not be coupled to both the front and rear legs 158 and 160 via the same connection. In some cases, one or more additional brackets, clamps or other connectors (not shown) may be included to establish any number of further frame leg connections. Further details regarding the manner in which the legs 158 and 160 are coupled to the remainder of the frame assembly 102 are provided below in connection with a number of exemplary embodiments.

In this exemplary case, the front legs 158 are disposed on an incline until about midpoint between the front and rear wheels 106, 109, at which point each front leg 158 is bent to a horizontal, cantilevered end 161 of the chassis 132. Each cantilevered end 161 extends rearward from the front legs 158 beyond the bracket 156 before being capped at termination points generally above the rear legs 160, as shown in FIG. 1. Alternatively, the front legs 158 are connected at the ends 161 by a U-shaped link or brace, as shown in the exemplary embodiment of FIG. 9.

Figure 2:
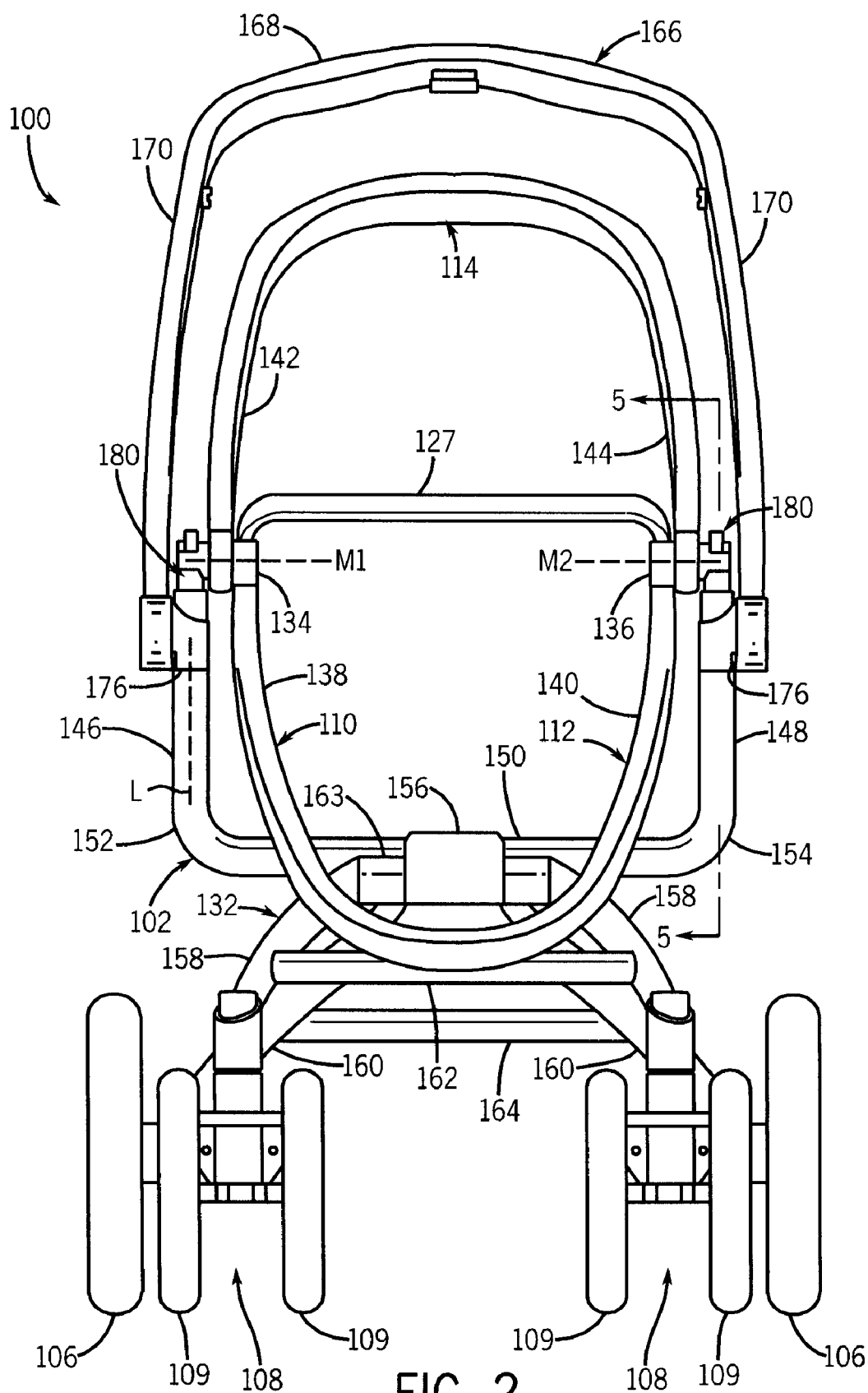
FIG. 2 is a front, elevational view of the stroller of FIG. 1.

The pair of front legs 158 are laterally connected by transverse front leg links 162 and 163 (FIGS. 2-4), while the pair of rear legs 160 are laterally connected by a transverse rear leg link 164 (FIGS. 2-4). The links 162-164 generally provide stability for the frame assembly 102. To this end, the leg links 162 and 164 extend horizontally between the legs connected thereby at a position approximately midway down the length of the corresponding legs. The front leg link 163 also extends horizontally between the front legs 158 at an upper end thereof. The bracket 156 engages the leg link 163 midway between the front legs 158, as best shown in FIG. 2. Each leg link 162, 163, 164 may be integrally formed with the legs connected thereby or otherwise attached in a secure manner to provide structural support. Other embodiments may alternatively or additionally include leg links disposed at different positions along the length of the legs 158, 160. In the exemplary embodiment shown, the front legs 158 are not linked to the rear legs 160 other than at the bracket 156. Alternatively, one or more leg links may also be provided to connect one of the legs 158 with one of the legs 160, in which case the connection may be adjusted to accommodate inward retraction toward one or more folded configurations, as described below. For example, a longitudinal link between a front leg 158 and a rear leg 160 may be sectioned with joints to facilitate folding. In these and other ways, the chassis 132 and, more generally, the frame assembly 102, may include any number and variety of leg links and other connectors in any desired configuration to provide a stable base or foundation for the seat assembly 104.

As shown in FIGS. 1 and 2, the stroller 100 includes a handle 166 that extends from the frame assembly 102 via a pair of adjustable connections. In this case, the connections are located at or on the posts 146 and 148. The adjustability of the handle 166 leads to a number of possible handle orientations. In the depicted orientation, the handle 166 extends in a rearward direction from the adjustable connections. Other orientations are described below in connection with further details regarding exemplary embodiments of the adjustable connections.

The handle 166 includes an arch-shaped end 168 to be engaged by a caregiver to push and maneuver the stroller 100. The end 168 may, but need not, be integrally formed with two side arms 170 of the handle 166 that are connected to the frame posts 146 and 148. The connections of the side arms 170 and the frame posts 146 and 148 may be disposed near a top end of each corresponding frame post 146, 148. As best shown in FIGS. 2-4, each connection may include a bracket, ring, clamp or other connector 176 to secure the handle 166 to the frame posts 146 and 148 at a desired position. In some cases, the location of the connectors 176 may be adjustable. For example, the clamp 176 may form a pressure fit around the frame posts 146 and 148 that can be released to move the clamp 176 to a new position along the frame posts 146, 148.

The height level of the seat assembly 104 may be adjustable relative to the ground level, or equivalently, the chassis 132 or the frame assembly 102. In some cases, the height level adjustment is accomplished via directly upward or downward movement, such as along a vertical direction V (FIG. 4) or, in some cases, along an axis of the frame posts 146 and 148. That is, the upward and downward movement generally does not alter the fore-and-aft (or longitudinal) position of the seat assembly 104 relative to the base frame or chassis 132. Avoiding any such alteration may be useful, for instance, in connection with maintaining a desired weight distribution between the front and rear wheels. In that way, any height level adjustments do not result in balance or stability issues. In other cases, the height level adjustment need not involve solely vertical movement, including when, for example, the longitudinal axes of the frame posts 146 and 148 are not vertically oriented.

In the exemplary embodiments shown, the height level adjustment generally involves one or more slider mechanisms involving an interface between the seat frame 110 to the base frame or chassis 132. For example, each slider mechanism may include a seat post or support leg that couples the seat frame 110 to the base frame or chassis 132. Each seat post or support leg, in turn, is generally aligned with a longitudinal direction L of the frame posts 146, 148, as shown in FIG. 2 in connection with the frame post 146. Each seat post or support leg is generally configured to slidably engage the respective frame post 146, 148 for movement relative to the chassis 132. Such relative movement of components of the frame, in turn, moves the seat assembly 104 between multiple, in-use height levels relative to the frame assembly 102.

In the exemplary embodiment shown in FIGS. 1-4, a pair of inner post assemblies 180 extend down from the seat frame 110 and are slidably engaged within the frame posts 146, 148 and, thus, serve as the seat posts or support legs that couple the seat frame 110 to the base frame or chassis 132. As best shown in FIGS. 3 and 4, the sliding relationship of the inner post assemblies 180 and the frame posts 146 and 148 is telescopic in nature in this example. Accordingly, each inner post assembly 180 generally provides a column or other insert shaped to be cooperatively received by the frame posts 146 and 148. FIG. 4 shows the inner post assemblies 180 after upward relative movement along the vertical direction V between the frame posts 146 and 148 and the inner post assemblies 180. As described further below, the inner post assemblies 180 include a number of components to facilitate the telescopic sliding relationship as well as for locking the seat assembly 104 into position at a desired height level. While this case involves the inner post assemblies 180 fitting inside of the frame posts 146 and 148, alternative telescoping arrangements may involve a reverse relationship where the frame posts 146 and 148 are inserted within, or received by, elements of the seat assembly or seat frame.

Notwithstanding the foregoing, the height level adjustment aspect of this disclosure is not limited to telescoping columns or other telescoping arrangements. On the contrary, the height level of the seat assembly 104 may involve other types of sliding arrangements, including, for instance, posts, shafts or columns arranged in side-by-side and other configurations for generally vertical movement to raise or lower the seat assembly 104. Furthermore, the relative movement of the frame components need not be linear. One example of non-linear movement may involve a threaded relationship that results in helical or twisting motion.

As a general matter, a height level adjustment involves disengaging a lock mechanism securing the seat assembly 104 in position, followed by moving the inner post assemblies 180 to a new position relative to the frame posts 146 and 148. The lock mechanism may then be re-engaged to maintain the new height level. In the exemplary case shown in FIGS. 1-4, movement of the seat assembly 104 results in an upward or downward displacement of the seat joints 134 and 136 (and pivot axes M1 and M2). Such displacement then results in corresponding changes in the height level of the seat bottom 122 and, more generally, the seat 118.

An exemplary slider mechanism 178 is shown in greater detail in FIGS. 5-8. In this case, the inner post assemblies 180 interact with the frame posts 146, 148 in accordance with a telescoping arrangement. The arrangement is structured to provide a discrete number (e.g., three) of height level options for the seat assembly 104 with a pin-based lock-and-release mechanism. Generally speaking, the pin-based lock-and-release mechanism involves a number of pins (i.e., one or more) engaging a corresponding set of slots at each height level option. The number of slot sets can vary considerably from the embodiment shown in FIGS. 5-8 and yet still fall within the scope of the invention. Consequently, alternative arrangements may present any desired number of height level options. Alternatively, other embodiments may support continuous (rather than discrete) height level adjustment for an infinite number of height level options.

Figure 5:
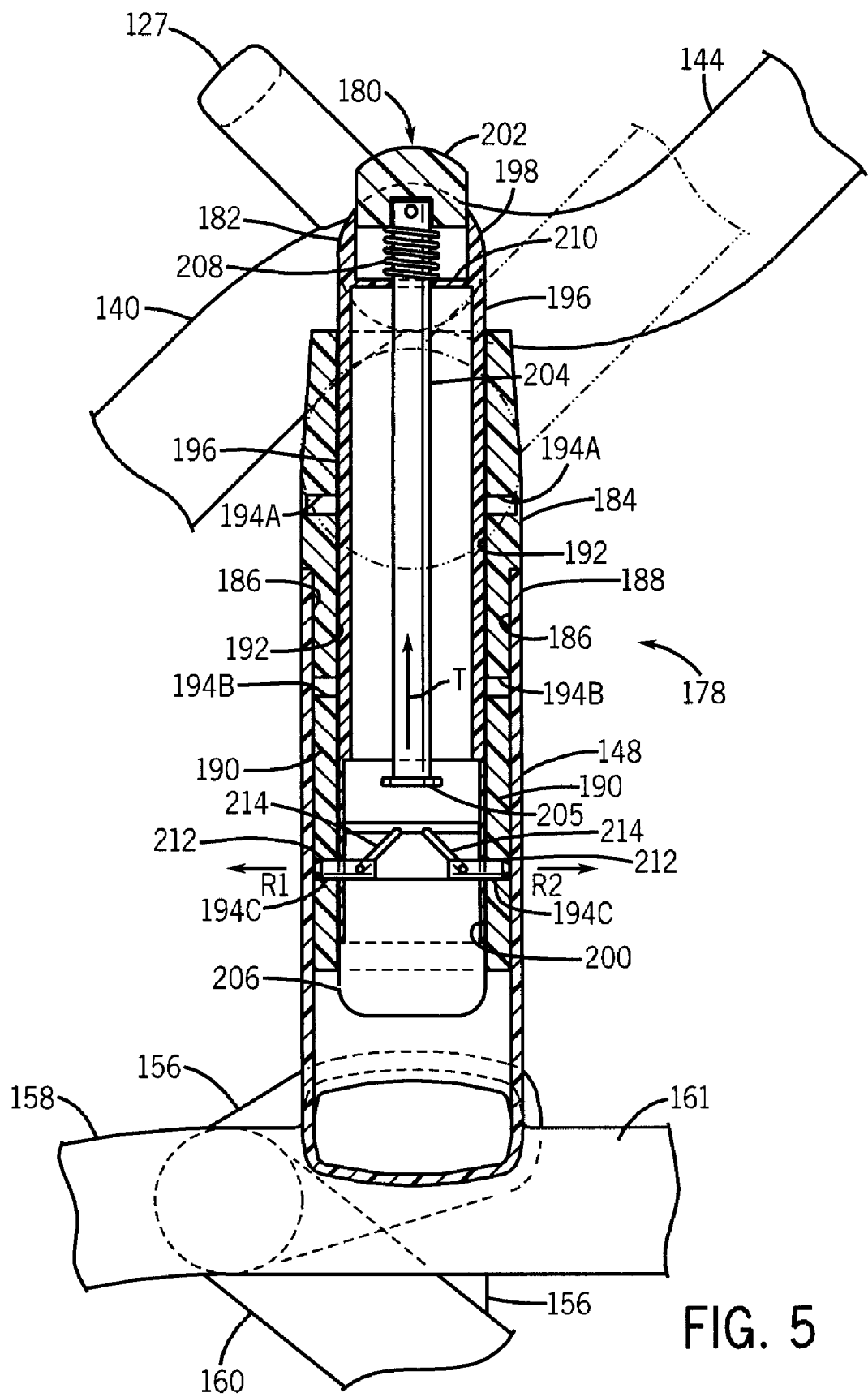
FIG. 5 is a sectional view of a sliding height adjustment assembly taken along lines 5-5 of FIG. 2.

Turning to FIG. 5, the exemplary inner post assembly 180 is shown partially disposed within the frame post 148 in a telescoping relationship. The inner post assembly 180 includes an upper end 182 protruding upward from a cap 184 that acts on an outer guide for alignment of the telescoping relationship. The cap 184 and the frame post 148 define a vertical shaft or other conduit in which the inner post assembly 180 is received. To that end, the cap 184 engages an inner surface 186 of the frame post 148 from a top end 188 of the frame post 148 downward to the extent that an insert portion 190 of the cap 184 is disposed within the frame post 148. The insert portion 190 of the cap 184 may be secured to the inner surface 186 in any desired fashion, including via an adhesive or pressure fit. Alternatively, the cap 184 and the inner surface 186 may be in threaded engagement.

To provide different seat height options, a number of slot pairs are formed at a corresponding number of height levels along an interior surface 192 of the cap or outer guide 184. Each slot pair is generally configured to receive a pair of pins to secure the inner post assembly 180 at one of the available height levels. In this exemplary case, a first pair of slots 194A correspond with an upper height level, a second pair of slots 194B correspond with a middle height level, and a third pair of slots 194C correspond with a lower height level. In each case, the slot pairs include one slot disposed on a forward or front side of the cap 184, and another slot disposed on a rearward or back side of the cap 184. However, the positioning, shaping, depth, number and other characteristics of the slots (or other detents or depressions) may vary considerably for cooperation with a variety of pins (or other projections), further details of which are provided below. For instance, each height level need not involve diametrically opposed pairs of slots as described above and shown in FIG. 5.

The inner post assembly 180 includes a stanchion or pillar 196 in telescopic sliding relationship with the interior surface 192 of the cap or outer guide 184. The stanchion 196 acts as a guide that cooperates with the cap 184 to allow and direct the slidable interface. The stanchion 196 may be shaped as a columnar shell or enclosure, the outer surface of which provides the guiding function, with the inner surface defining an interior cylinder, or internal chamber, that houses further components of the inner post assembly 180. In this case, the stanchion 196 has a closed, upper end 198 that protrudes upward and outward beyond the cap 184. An open, lower end 200 of the stanchion 196 is disposed within the frame post 148. The positioning of these ends 198, 200 relative to the frame post 148 (and, more generally, other portions of the frame assembly 102 and chassis 132) can change dramatically during a seating height adjustment.

The lock-and-release components of the inner post assembly 180 are now described. Beginning near the top of the inner post assembly 180, a release button 202 extends upward from the upper end 198 of each stanchion 196. The release button 202 is in communication with a central tube or shaft 204 disposed in the chamber of the assembly 180. The release button 202 and the central tube 204 are coupled via, for instance, a pin or other connector. Alternatively, the button 202 may be formed integrally with the central tube 204. The central tube 204 generally extends through much of the length of the internal chamber defined by the stanchion 196 until a lower end 205 of the tube 204 is captured by, or otherwise in communication with, a plug 206 of the assembly 180. In the position shown in FIG. 5, the plug 206 is biased upward along a longitudinal axis T of the center tube 204 by a spring 208 acting on a platform 210 near the upper end 198 of each stanchion 196. Such biasing of the center tube 204, in turn, raises the plug 206 such that a pair of pins 212 are biased outwardly in radial directions R1 and R2, as shown in FIG. 5. The pins 212 are biased outwardly because the longitudinal position of the plug 206 is forcing the pins 212 toward the bottom of respective tracks 214 formed within the plug 206. More specifically, each track 214 is sloped (e.g., inclined or declined with respect to the longitudinal axis T) to translate the longitudinal position of the plug 206 into a radial or transverse position of the corresponding pin 212. To this end, a projection coupled to each pin 212 rides within respective tracks 214 formed within the plug 206, as shown in FIG. 8.

Figure 6:
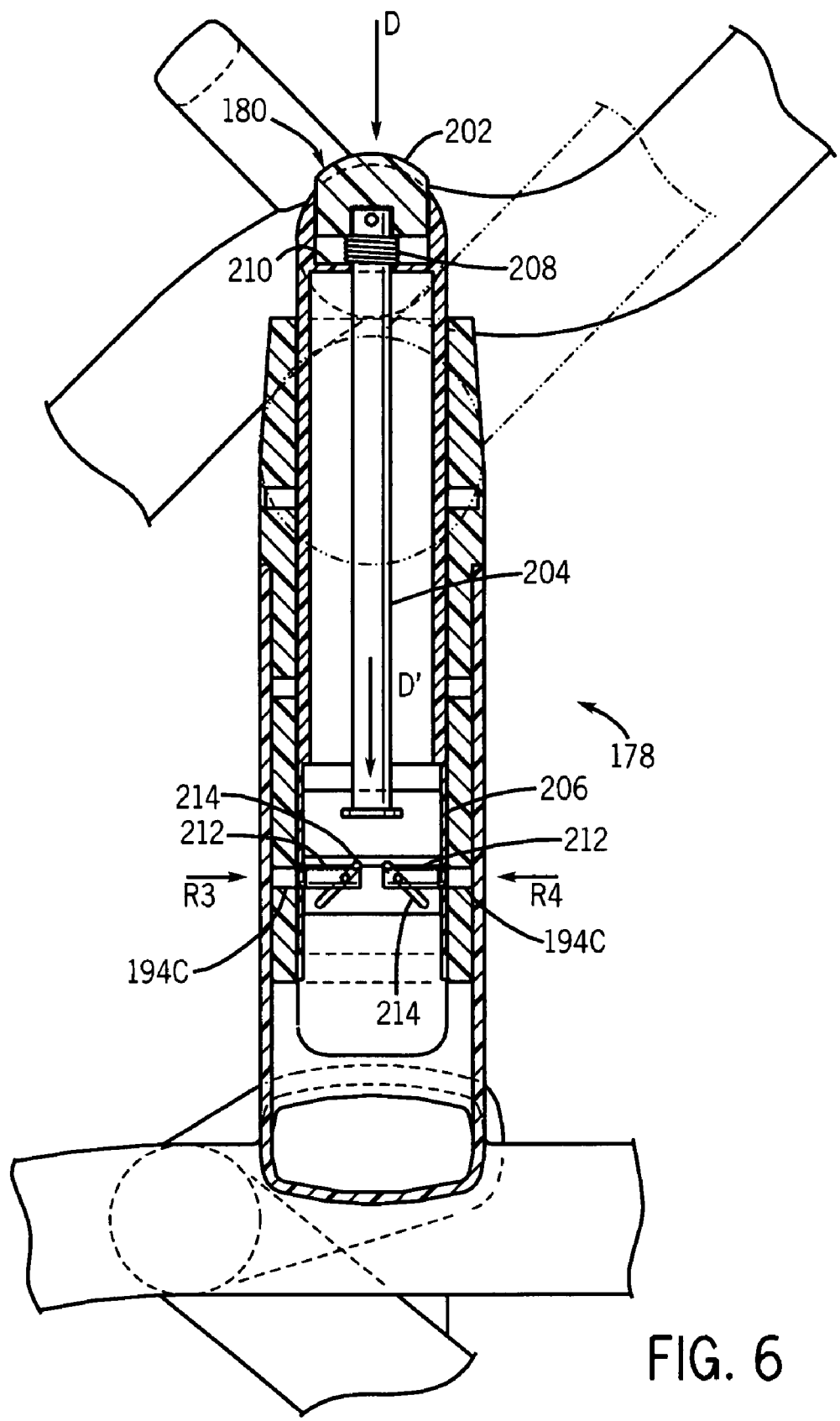
FIG. 6 is a sectional view of the sliding seat height adjustment assembly of FIG. 5 upon actuation of a release mechanism for adjustment of the height level of the seat assembly.

FIG. 6 shows the actuation of the button 202 with an applied force D to release the inner post assembly 180 from a locked position at the lowest height level (i.e., the slot pair 194C). The platform 210 may be configured and shaped to allow the central tube 204 to pass through and be displaced downward when the spring 208 is compressed via the force D. Driving the central tube 204 downward in the direction of the applied force D, in turn, applies a downward force D' on the plug 206, displacing the plug 206 downward relative to the pins 212, which remain partially located in the slots 194C at least initially. However, as the tracks 214 of the plug 206 are displaced downward, the tracks 214 apply radially inward forces R3 and R4 as the pins 212 follow the tracks 214. Eventually, the pins 212 are fully retracted from the slots 194C. The plug 206 and other components of the inner post assembly 180 may be configured so that such fall retraction of the pins 212 occurs upon a substantially complete depression of the release button 202. Furthermore, the spring constant of the bias spring 208 may be selected such that a child occupant would not be capable of, or at least have great difficultly in, completely or sufficiently depressing the release button 202. Moreover, actuation of only one of the buttons 202 will not result in a height level adjustment, insofar as the other inner post assembly 180 will remain locked in position. In these ways, the two-sided or duplex nature of the seat height level adjustment further promotes a child-proof lock-and-release mechanism. In this specific case, the duplex adjustment is provided by twin or paired telescoping arrangements on either side of the seating, but other arrangements or locations involving multiple interfaces may alternatively be utilized.

Figure 7:
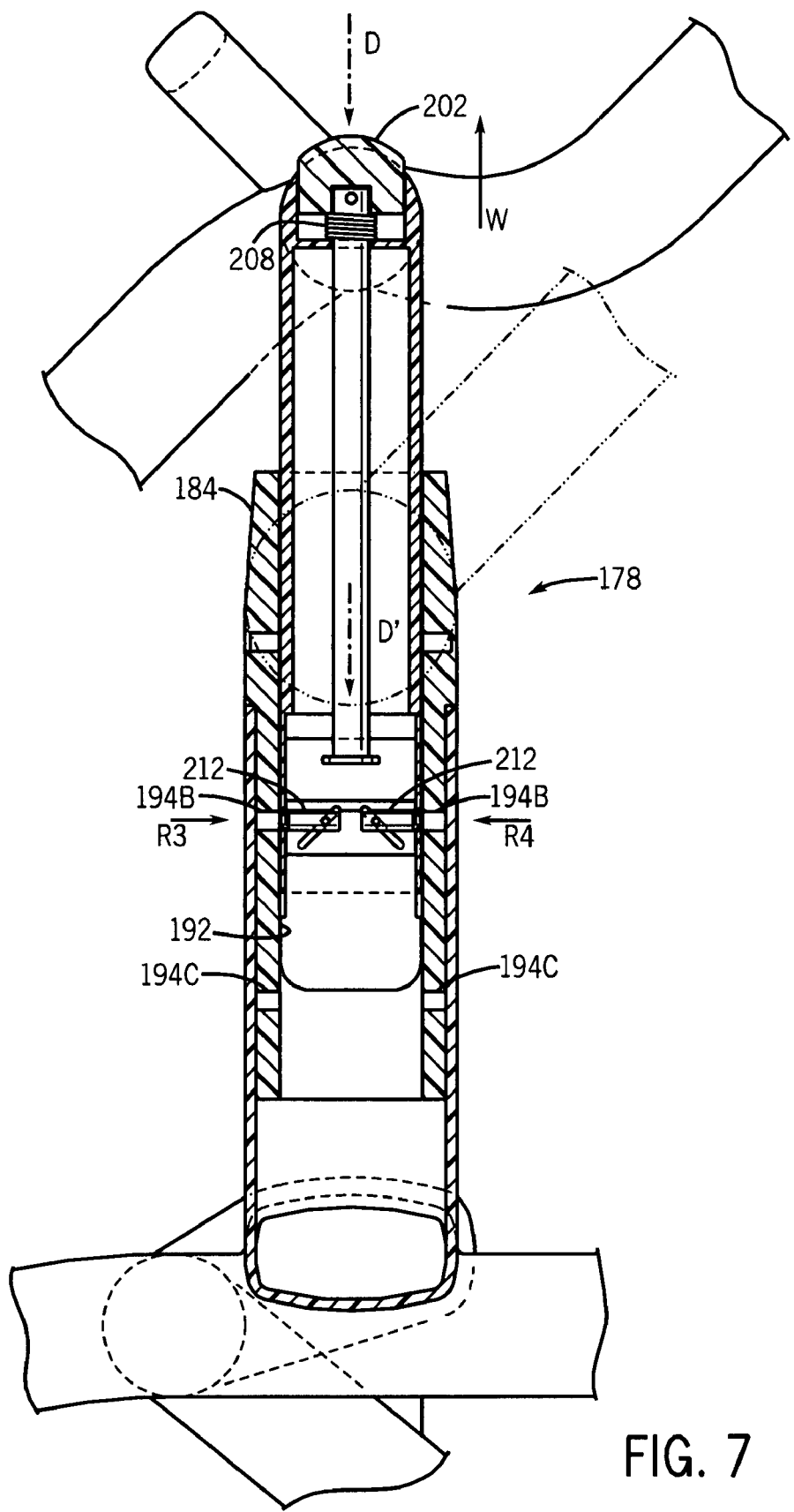
FIG. 7 is a sectional view of the sliding height adjustment assembly of FIGS. 5 and 6 after adjustment of the seat assembly to a higher level but before being locked into position.

Turning now to FIG. 7, the height level of the seating can be adjusted with the disengagement of the pins 212 from the slots 194A-C. With the pins 212 in a retracted position, an upward force W applied to a portion of the seat mounting frame 110 (or any portion of the seat assembly 104) can slide the inner post assembly 180 upward to raise the seating as shown. In this example, the inner post assembly 180 has been raised from the lowest slots 194C to the level of the middle slots 194B. During the movement between the two height levels, the downward force D applied to the release button 202 may be maintained, keeping the pins retracted as shown. Alternatively, the force D may be discontinued once the pins 212 are no longer aligned with the slots 194C. In between the two levels, the pins 212 will not be able to fire outward completely, as the inner surface 192 of the cap 184 blocks the outward displacement despite the bias force of the spring 208. Once the level of the slots 194B is reached, however, the spring 208 will be allowed to decompress as the pins 212 fire outward to engage the slots 194B.

Figure 8:
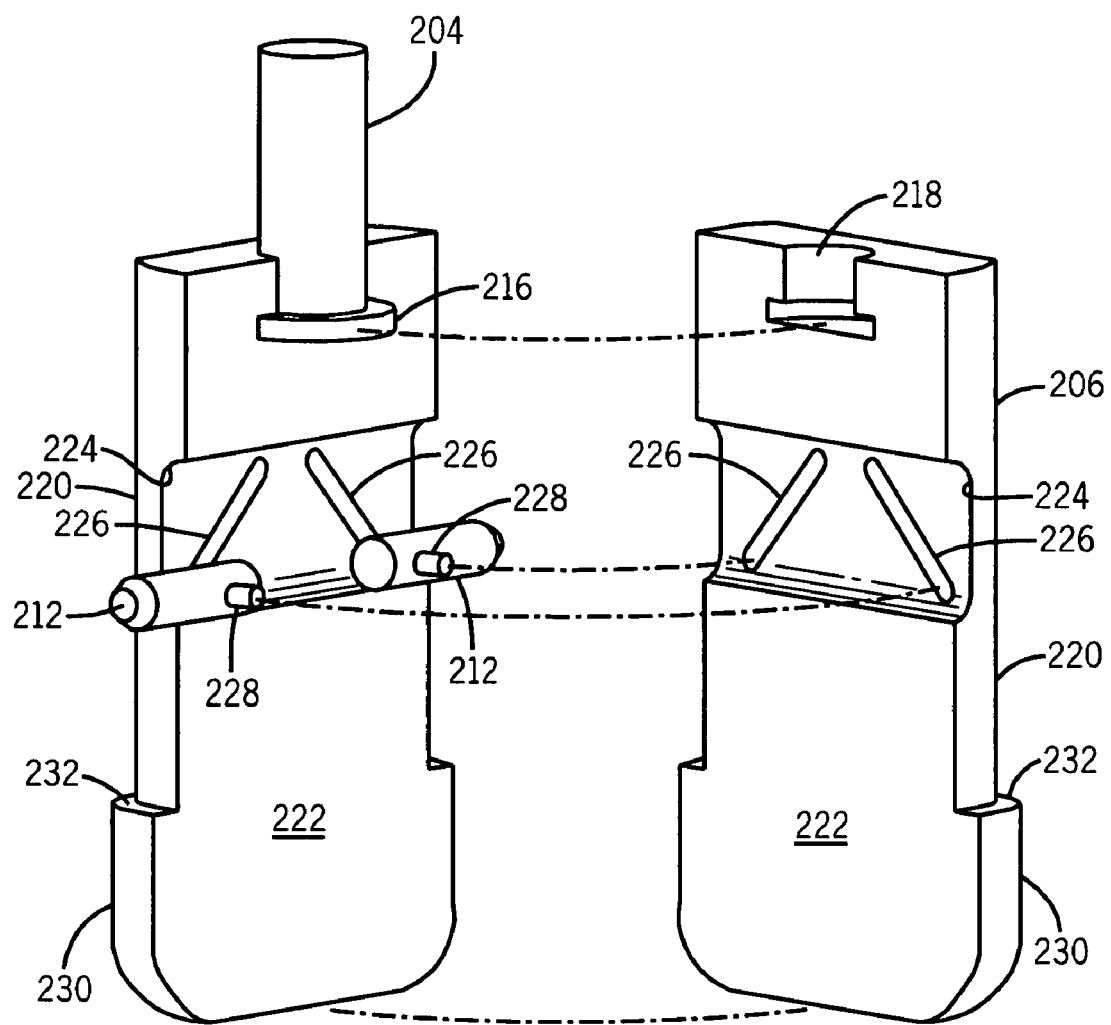
FIG. 8 is a partial, exploded view of the lock-and-release components of the sliding seat height adjustment assembly of FIGS. 5 and 6.

FIG. 8 shows the plug 206 and its engagement with the central post 204 in greater detail. In this exemplary case, an enlarged end 216 of the central tube 204 is received within complementary depressions 218 formed within mirrored halves or parts 220 of the plug 206. To secure the central tube 204 in position and form the plug 206, the mirrored parts 220 are joined at respective faces 222. Each face 222 includes a recessed portion 224 to form an interior chamber in which the pins 212 travel. Indents 226 for the sloped tracks 214 are formed in each recessed portion 224 and shaped to receive projections 228 extending transversely from each pin 212. In operation, the projections 228 are guided by the indents 226 to travel along the tracks 214 as the plug 206 is displaced.

A lower end 230 of each mirrored part 220 of the plug 206 has a radially extending shelf that forms an enlarged end cap 232 when the mirrored parts 220 are joined. The enlarged end cap 232 limits the insertion of the plug 206 within the sleeve formed by the inner post assembly 180.

The components of the inner post assembly 180 may be composed of a variety of materials, including, for instance, strong, durable plastics, metal, or the like. Generally speaking, materials may be selected for certain components of the inner post assembly 180 in accordance with the degree to which the component provides structural support.

Although described above in connection with a pin-based lock-and-release mechanism, practice of the seating height level adjustment invention described herein may utilize or involve components other than pins to secure the seating in position at a desired height level. For example, alternative locking mechanisms may utilize bolts, brackets, clamps and other fasteners that may be released or otherwise adjusted to permit height level adjustment. Such alternatives may be useful in situations where a continuum of seating height levels is desirable. Other embodiments may involve one or more rods or bolts that engage holes formed in frame tubing. In these and other cases, the frame tubing and other components in sliding relationship during the height level adjustment need not be telescoping, but rather may be disposed in a variety of alternative configurations or arrangements.

Of those embodiments utilizing pins, the positioning, arrangement and control of the pins and other components of the adjustment mechanism may vary considerably from the exemplary embodiment described above. For instance, a release button need not be positioned near a top end of an adjustment post, but rather may be disposed at a lower or more rearward position. In some cases, one or more release buttons may be disposed on side or bottom faces or portions of the frame posts. For example, a release button disposed underneath the frame interface may be suitably out of reach of the child occupant, in which case only a single release mechanism may be acceptable. In these and other embodiments, the release button(s) may correspond with ends of locking pins that extend radially through holes in the frame components. Such locking pins may be spring-biased outwardly through the holes. More generally, relocating the release button away from the seat occupant may be useful in situations in which a seat occupant can possibly overcome a bias force, such as a bias spring, such as when a lower bias force is desired.

In accordance with one aspect of the disclosure, the frame assembly 102, the handle 166, and other components of the stroller 100 are generally adapted to facilitate reconfiguration between one or more operational, or in-use, orientations and one or more folded orientations in which the stroller 100 is disposed in a convenient, compact arrangement. Reconfiguration to a folded orientation may involve longitudinal, inward retraction of components of the frame assembly 102. In these and other cases, the stroller 100 may be configured to be capable of standing in a balanced, upright manner while folded. More generally, a folded orientation may also involve displacement of the handle 166 to one or more storage positions. To this end, the handle 166 is attached to the frame assembly 102 at a pivotal or rotational connection. In some cases, the pivotal connection is further configured to position the handle 166 in a number of operational orientations, including, for instance, multiple forward orientations and multiple rearward orientations.

Figure 9:
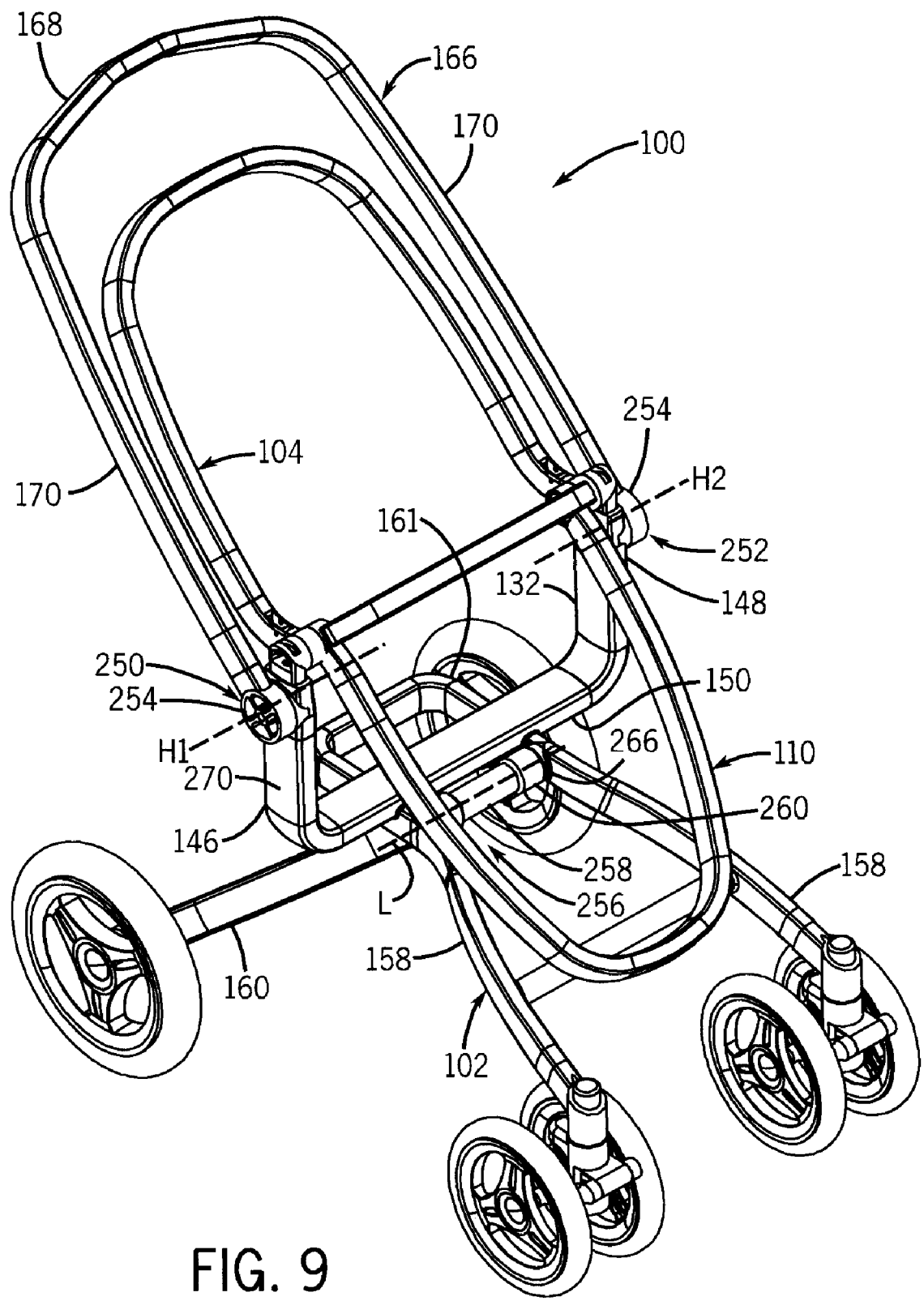
FIG. 9 is a front, perspective view of an exemplary stroller having an adjustable handle disposed in a rearward position of an in-use orientation of the stroller.

FIG. 9 depicts a first, in-use orientation of the stroller 100 in which the handle 166 extends toward the rear of the stroller 100. This orientation generally facilitates caregiver maneuvering of the stroller 100 in a forward direction. In this exemplary case, the handle 166 extends rearward from the frame posts 146 and 148. The side arms 170 incline from the frame posts 146 and 148 to an extent that determines the height and other positioning of the handle 166 for the caregiver. As described below, the positioning of the handle 166 is adjustable to, among other things, modify the declination (or inclination) of the side arms 170 and, in so doing a, change the height or position of the end 168 of the handle 166.

The position of the handle 166 is adjustable via a pair of rotational or pivotal handle joints 250 and 252 located near a top end of a respective one of the frame posts 146, 148. Specifically, the side arms 170 of the handle 166 are connected to the frame posts 146 and 148 at the handle joints 250 and 252. Each handle joint 250, 252 may be connected to, or include, a respective one of the clamps 176 that secure the handle 166 to the frame posts 146 and 148 at a desired vertical position. Each handle joint 250, 252 may also include an end cap or ring 254 to which the side arms 170 are attached. The rotation of the end rings 254 on a pair of pivot axes H1 and H2 adjusts the inclination or declination angle of the handle 166. In this exemplary case, the pivot axes H1 and H2 are located near the pivot axes M1 and M2 (FIG. 2) associated with adjustments to components of the seat frame 110, as described above. Specifically, each one of the pivot axes H1 and H2 is located directly beneath, and parallel to, one of the pivot axes M1 and M2. Other relative positions of the pivot axes H1 and H2 (and, thus, the handle joints 250, 252) are possible. For instance, the frame posts 146 and 148 need not be vertically upright in the operational orientation. Moreover, in some cases, the location of the handle joints 250 and 252 may be adjustable, as described above in connection with the movement of the clamps 176 for re-positioning along the frame posts 146, 148.

FIG. 9 also depicts a folding mechanism of the frame assembly 102 indicated generally at 256. The folding mechanism 256 is generally disposed at a location of the frame assembly 102 at which one or both pairs of the frame legs 158, 160 meet to support the seat assembly 104 and other components of the stroller 100. In the exemplary embodiment shown, the folding mechanism 256 is located at the connection between the frame legs 158, 160 and the cross-brace 150 of the chassis 132 supporting the seat assembly 104. As described above, the connection may include the bracket 156

(FIG. 2). In some cases, the bracket 156 facilitates a structural connection between the legs 158, 160 and the cross-brace 150. In these and other cases, the bracket 156 encloses one or more other components of the folding mechanism 256, including a frame link and pivot joint assembly 258. The bracket 156 is not shown in FIG. 9 for the convenience of revealing further details regarding the frame link and pivot joint assembly 258.

The frame link and pivot joint assembly 258 is generally directed to the repositioning of one or both of the front legs 158 and the rear legs 160 relative to other components of the frame assembly 102. Such repositioning facilitates the reconfiguration of the stroller 100 between an in use, or operational, orientation and a folded, or storage, orientation. To these ends, the frame link and pivot joint assembly 258 includes the transverse link 163 (FIG. 2) that couples the front legs 158 together. The link 158 may also be involved in adjustably coupling the front legs 158 and the rear legs 160 to the remainder of the frame assembly 102. Specifically, the transverse link 163 extends laterally between the front legs 158 on an axis L about which rotation can occur to reposition either the front legs 158, the rear legs 160, or both. The legs 158, 160 may be repositioned relative to the remainder of the frame assembly 102 in this manner. As described below in connection with exemplary embodiments, the transverse link 163 may fixedly couple the front legs 158 while allowing the rear legs 160 to rotate inwardly or retract to a more forward position and, thus, a more compact, or folded orientation for the stroller 100. The front legs 158 may nonetheless retract inwardly as well via a tilting or rotation of the frame assembly 102 (rather than via rotation about the axis L).

Figure 10:
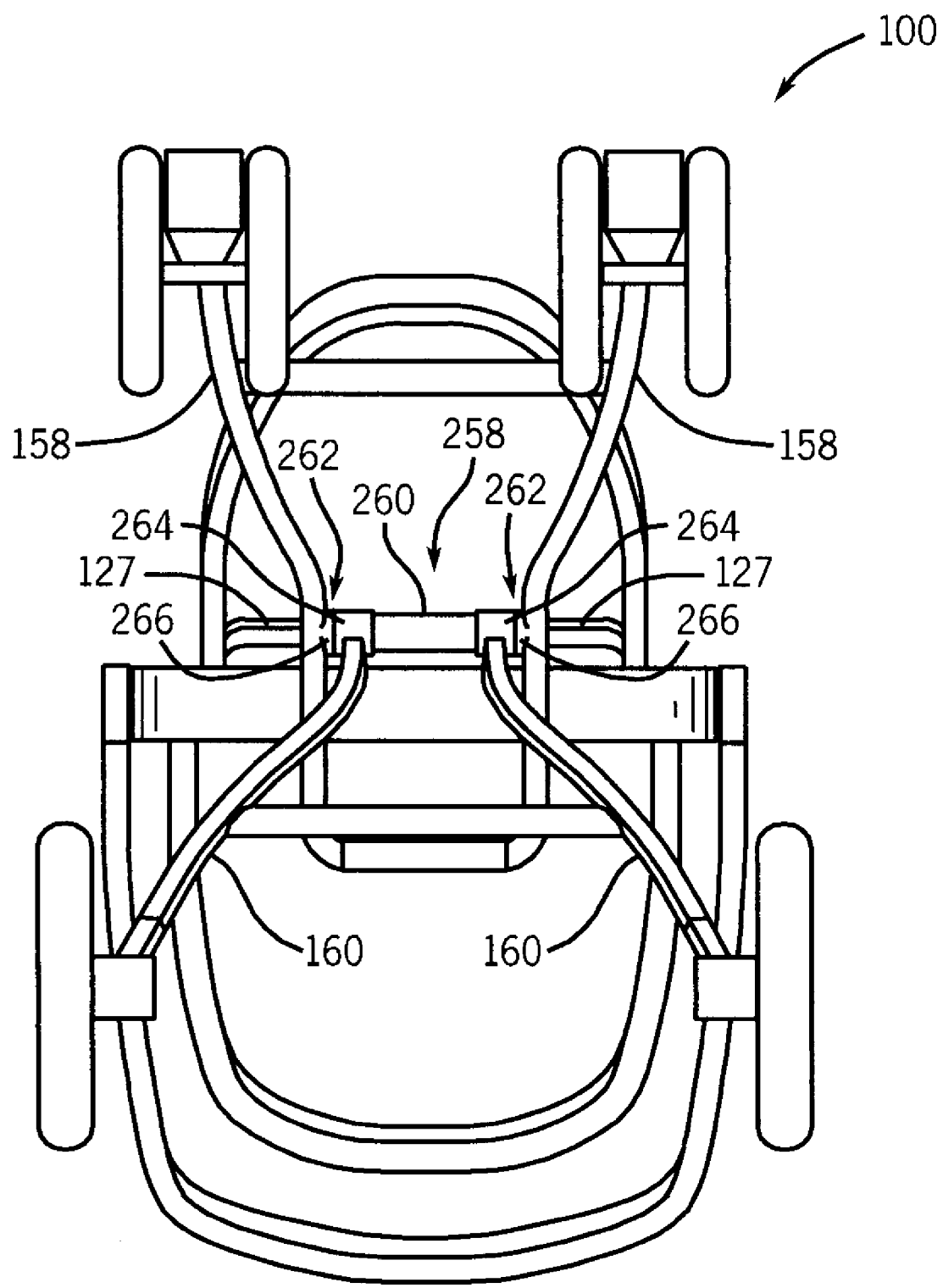
FIG. 10 is a bottom view of the stroller of FIG. 9.

Further details regarding the frame link and pivot joint assembly 258 are provided in connection with the exemplary embodiment shown in FIG. 10. In this case, the assembly 258 includes an outer sleeve or tube 260, which may form a portion of the transverse link 163 shown in FIG. 2 laterally extending from either side of the bracket 156. The outer sleeve 260 connects to the front legs 158 at respective interfaces 262 located at ends 264 of the outer sleeve 260. Each interface 262 may include or involve a variety of interconnecting components or configurations. For example, the ends 264 of the outer sleeve 260 may engage lateral projections 266 that extend transversely from the front legs 158 to reinforce the interfaces 262. In that case, each interface 262 involves the projection 266 slidably engaging the end 264 of the sleeve 260. Specifically, rotation of the sleeve 260 relative to the projections 266 occurs during reconfiguration between the stroller orientations. The engagement of the ends 264 of the sleeve 260 and the projections 266 may also include or involve a lock or release mechanism (e.g., a detent mechanism) for securing the position of the sleeve 260 relative to the projections 266. In this way, the lock or release mechanism enables a caregiver to controllably reposition the frame legs (e.g., the rear legs 160) and, in so doing, reconfigure the stroller 100.

The frame link and pivot joint assembly 258 may also include components or features internal to the sleeve 260 to engage the front legs 158 in a secure and stable manner. For example, an internal surface (not shown) of the sleeve 260 may engage a shaft or rod(s) (not shown) connected to and extending from the projections 266. The internal surface of the sleeve 260 may be cylindrically shaped such that the sleeve 260 may rotate on the rod(s). The engagement of the sleeve 260 and the rod(s) may include or involve a lock or release mechanism (e.g., a detent mechanism) for securing the position of the sleeve 260 and, thus, the position of one or more frame legs. In one exemplary embodiment, the frame link and pivot joint assembly 258 includes a pair of rods (not shown), each of which extends from one of the projections 266. For example, each rod may extend into the interior of the sleeve 260 to an extent commensurate with the length of the ends 264.

The lock or release mechanism involved in positioning components of the frame link and pivot joint assembly 258 may alternatively or additionally involve the bracket or cover 156 (FIG. 2). To this end, the portion of the sleeve 260 between the ends 264 may interact with the bracket 156 to secure the position of the assembly 258. For example, the interaction may include or involve a detent mechanism disposed at the interface between the bracket 156 and the sleeve 260.

The frame link and pivot joint assembly 258 and the adjustable handle 166 are generally involved in reconfiguring the stroller 100 between one or more operational orientations and one or more folded or storage orientations. Several exemplary stroller orientations are now shown and described in connection with FIGS. 11-18. In these figures, the stroller 100 is depicted in simplified form to highlight the positioning and orientation of the frame assembly 102 and other structural components of the stroller 100.

Figure 11:
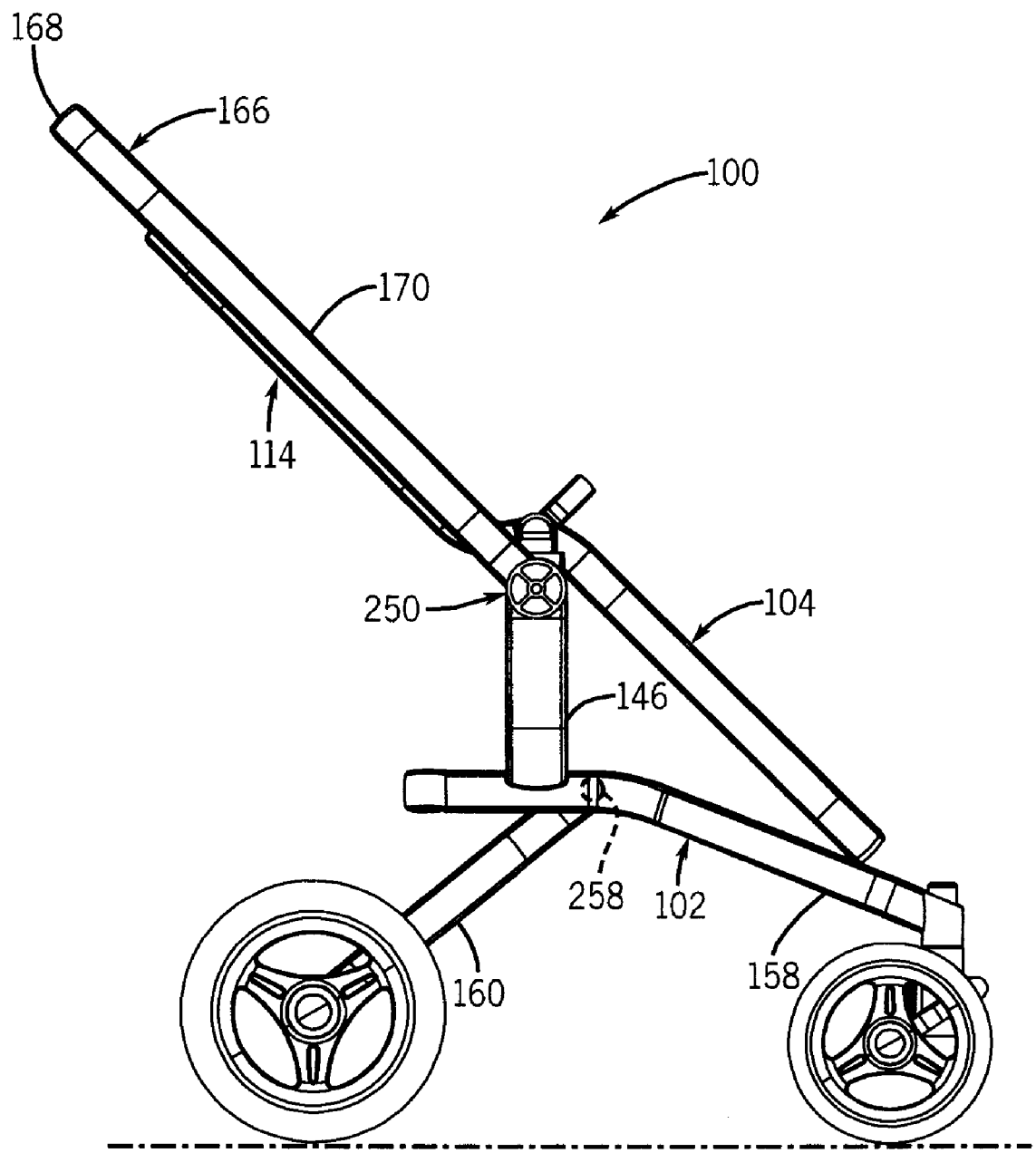
FIG. 11 is a side, elevational view of the stroller of FIG. 9.

Turning now to FIG. 11, one of several, in-use orientations of the stroller 100 is shown. In this orientation, the handle 166 is disposed in a rear, in-use position configured for maneuvering the stroller 100 in a generally forward direction. More specifically, the handle 166 is generally aligned with the upper seat attachment tube 114. In that sense, the side arms 170 of the handle 166 and the upper seat attachment tube 114 extend upward and rearward at generally the same inclination angle. However, the side arms 170 of the handle 166 need not be disposed in parallel with the tube 114 as shown, as the handle joints 250 and 252 (FIG. 9) may be used to modify the angle at which the handle 166 extends away from the support posts 146 and 148 (FIG. 9). For example, the side arms 170 of the handle 166 may be oriented in a lower, or more horizontal, position than the upper seat attachment tube 114. In some cases, the handle joints 250 and 252 may present a discrete number of optional handle positions for this stroller orientation. For example, each handle joint 250, 252 may include a gear (not shown) or other internal mechanism that would support movement between a number of handle positions. In some cases, the handle position may be continuously adjusted downward or upward from the height position shown in FIG. 11.

Actuation of the gear or other mechanism may involve the release or other engagement of a locking mechanism that includes or interfaces with the gear mechanism to secure the handle 166 in position. The engagement of such locking mechanisms may be controlled by one or more release buttons, rotatable handgrips, levers, or other user-engaged actuation items (including combinations thereof) located on the handle 166 (e.g., at or near the apex of the end 168) or at some other location convenient for the caregiver. The button, grip or other actuation item may then be coupled to the gear or other internal components via cabling, chains and the like. Details of exemplary, cable-operated, one-hand release and actuation mechanisms are disclosed in commonly owned U.S. Pat. Nos. 6,068,284 and 6,155,740, the disclosures of which are incorporated herein by reference.

The in-use or operational orientation of the frame assembly 102 generally positions the front and rear legs 158 and 160 in an inverted V-shaped configuration. Each leg 158, 160 generally descends from the longitudinally centered location of the pivot joint 258. As best shown in FIG. 11, the legs 158, 160 are fully extended outwardly, or longitudinally, from the centered location of the pivot joint 258. In this position, the components of the seat frame assembly 104 are generally oriented upright for operation. For example, the posts 146 and 148 (FIG. 9) are vertically oriented to support the remainder of the seat frame assembly 104 in an upright manner.

Figure 12:
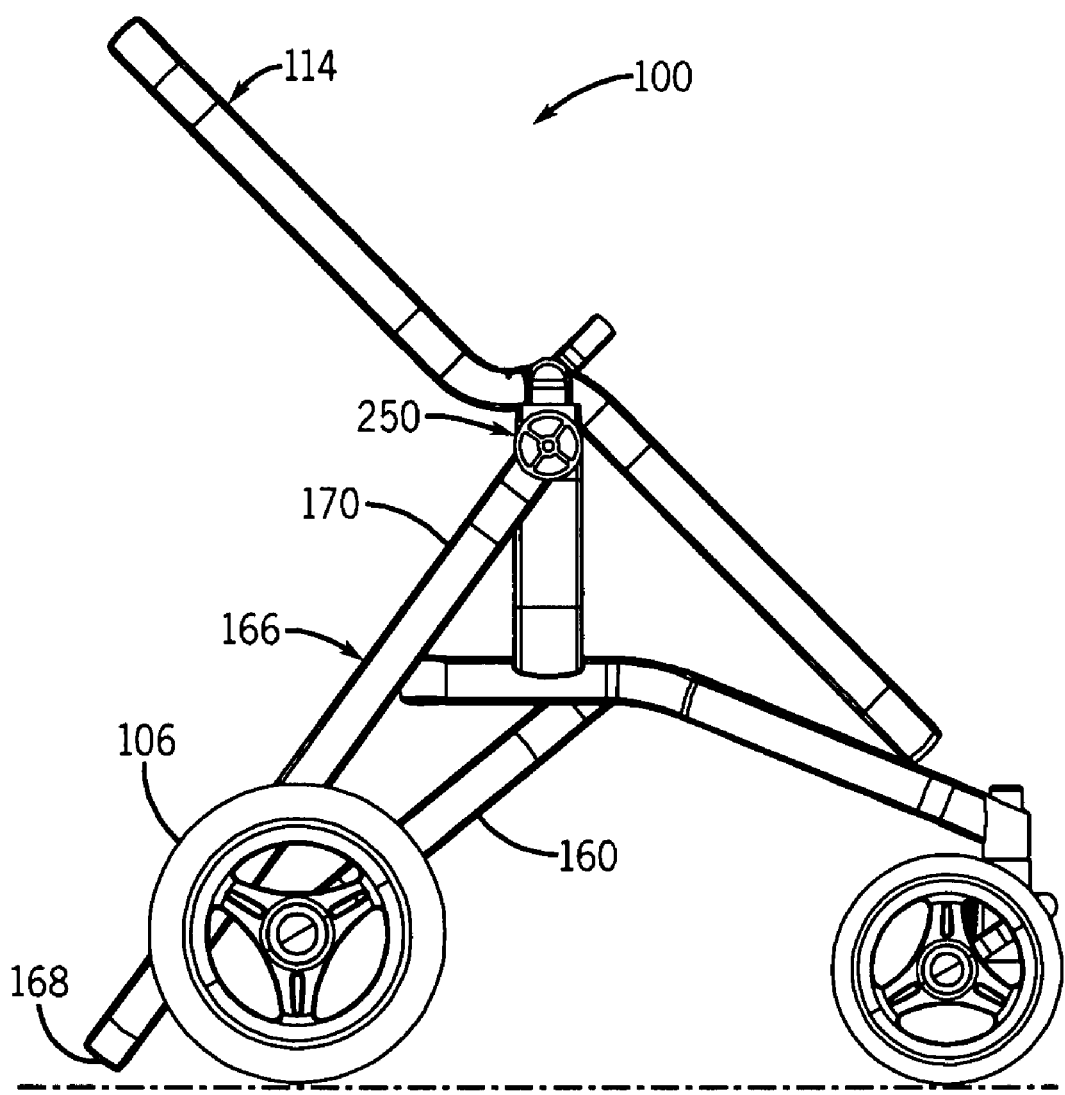
FIG. 12 is another side, elevational view of the stroller of FIG. 9 with the adjustable handle displaced from a rearward position toward a folded orientation of the stroller.

FIG. 12 depicts an intermediate arrangement in a folding sequence that may begin with the stroller oriented as shown in FIG. 11. The folding sequence includes lowering the handle 166 to a lower, rear position in which the side arms 170 slope downward in between the rear wheels 106. At this point, the handle 166 may be lowered to an extent limited by the ground surface upon which the stroller 100 rests. In some cases, the handle 166 may rest on a portion of the rear legs 160 or the rear wheels 106 before contacting the ground surface.

To initiate the folding sequence, a caregiver may actuate the lock and release mechanism (not shown) involved in adjusting the position of the handle 166 between different operational orientations. In some cases, the same release mechanism is used to initiate the movement of the handle 166 and the folding sequence. For example, rotating a handgrip in one direction may enable handle repositioning, while rotating the handgrip in the opposite direction initiates the folding sequence (which may include handle repositioning). In other cases, actuation of an additional release mechanism (not shown) may be involved to enable rotation of the handle 166 beyond a certain height level or degree of inclination or and a declination (e.g., horizontal). The additional release mechanism may also be involved in enabling the movement of other components of the stroller 100 during the folding sequence. However, through this point in the folding sequence, the reconfiguration of the stroller 100 involves only rotation of the handle 166 about the handle pivot joint 250. Actuation buttons, handgrips, etc. for one or both of the release mechanisms may be located on the handle 166, near the handle pivot joint 250, or at any other desired location on the stroller 100. In one exemplary case, the handle 166 includes primary and secondary buttons, handgrips or other actuation mechanisms to be depressed or actuated by a caregiver. The primary mechanism enables handle rotation generally as well as actuation of the secondary mechanism to initiate the folding sequence. In this manner, folding the stroller 100 beyond the repositioning of the handle 166 requires actuation of a secondary latch or lock. The actuation mechanisms may be coupled to one another, as well as components in the handle joints 250 and 252 via, for instance, cables or other linkage (not shown) concealed within the end 168 and the arms 170 of the handle 166.

Figure 13:
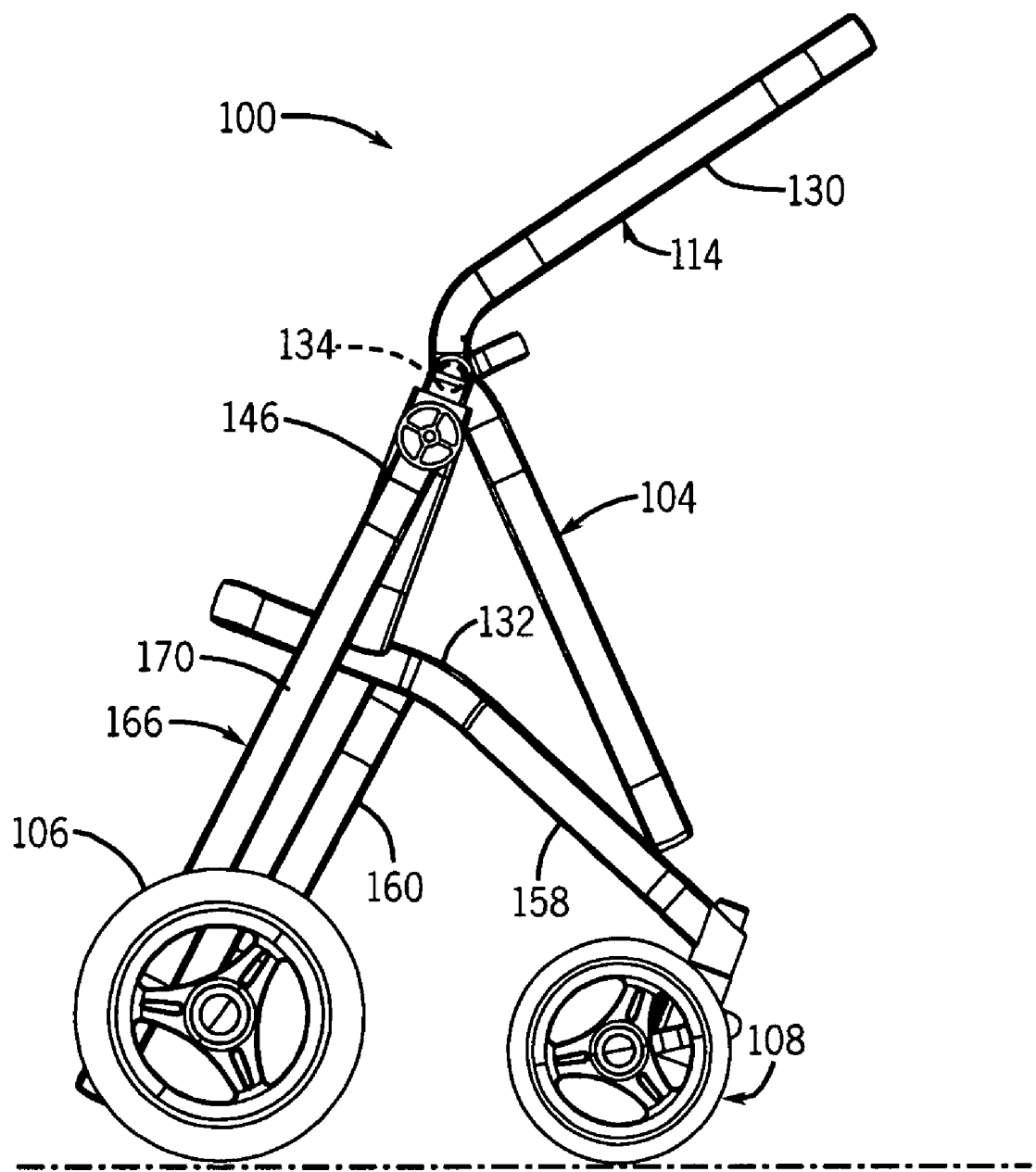
FIG. 13 is yet another side, elevational view of the stroller of FIG. 9 during further displacement toward the folded orientation of the stroller.
Figure 14:
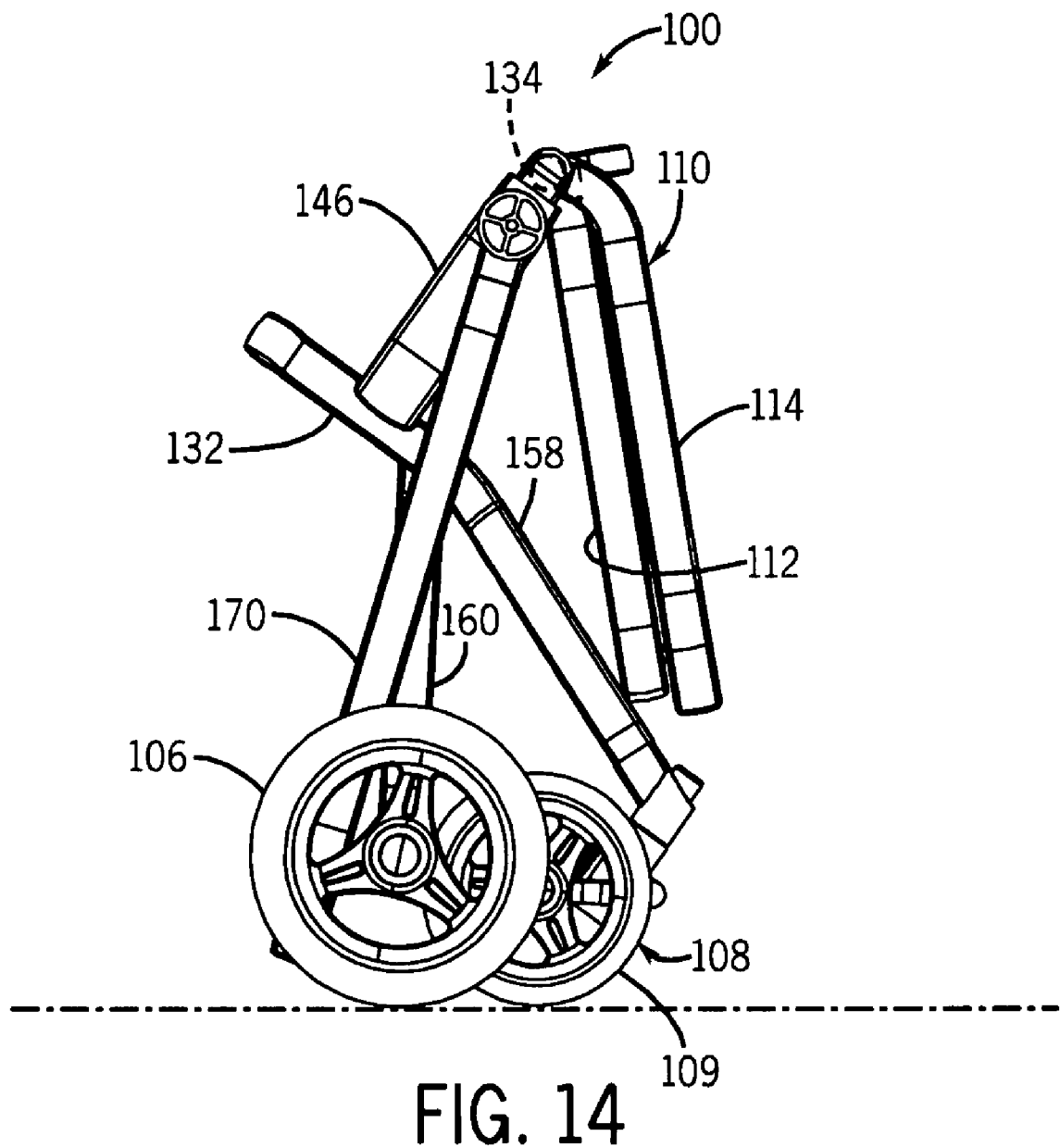
FIG. 14 is yet another side, elevational view of the stroller of FIG. 9 in the folded orientation in which the stroller is inwardly retracted for disposition in a compact, upright and standing position.

FIGS. 13 and 14 depict two successive stages of the folding sequence in which other portions of the frame assembly 102 are rearranged into a compact orientation. FIG. 13 shows the next step (or steps) in the folding sequence following the lowering of the handle 166. Specifically, the upper tube 114 of the seat frame 110 is rotated forward (clockwise) at the pair of rotational or pivotal seat joints 134 and 136 (FIG. 2), and the rear legs 160 are retracted longitudinally inward to a more upright orientation. These adjustments may be integrated to any desired extent, such that movement of, for example, the rear legs 160 is enabled by or otherwise linked to the movement of the upper tube 114 forward as shown. Similarly, these adjustments may be triggered or enabled by the movement of the handle 166 to its lowest position, or via the passing of some other predetermined threshold position. In either case, further movements by the caregiver of the triggering component may result in release or movement of the other components involved in the folding sequence.

The inward retraction of the rear legs 160 and the rear wheels 106 may begin the rearrangement of the stroller 100 into the compact orientation. The inward retraction of the rear legs 160 may, but need not, be facilitated or driven by further rotation of the handle 166. For example, the handle 166 and the rear legs 160 are brought into alignment in the increasingly upright orientation shown, after which further rotation of the handle 166 may drive the rear legs 160 increasingly inward and upright. As the rear legs 160 are increasingly disposed in an upright manner, the rear wheels 106 are longitudinally retracted inward toward the front wheel assemblies 108. As a result, the stroller 100 becomes increasingly compact in the longitudinal direction.

The inward retraction of the rear legs 160 also results in a forward tilting of the frame chassis 132, including the front legs 158. The forward tilting of the chassis 132 is readily shown by reference to the support posts 146 and 148 (not shown), which now are leaned forward to an extent commensurate with the forward tilting of the chassis 132. In this way, the position of the front wheel assemblies 108 is also modified relative to the rear wheels 106. That is, the front wheel assemblies 108 are also inwardly retracted as a result of the forward tilting of the chassis 132, even though the front legs 158 are fixedly coupled to the other tilted portions of the chassis 132. Specifically, the front wheel assemblies 108 are inwardly retracted toward the rear wheels 106, leading to further longitudinal contraction.

In some embodiments, one or more components of the seat assembly 104 may be removed from the seat frame 114 before initiation of the folding sequence. In any case, the stroller 100 is depicted in FIGS. 13 and 14 with the understanding that certain components of the stroller 100 are not shown for ease in illustration.

FIG. 14 depicts the final configuration of the folding sequence and, thus, an exemplary folded orientation of the stroller suitable for storage, portability, etc. In this orientation, the handle 166 is lowered to a rear storage position that may involve further rotation beyond the position depicted in FIG. 13. The handle 166 remains generally aligned with, and adjacent to, the rear legs 160 for a compact arrangement. However, the rear legs 160 are no longer roughly parallel with the side arms 170 of the handle 166, as shown in FIG. 13. Instead, the rear legs 160 have been further retracted longitudinally inward to a more upright position. Specifically, the rear legs 160 are now more vertically oriented than the side arms 170 of the handle 166. Nonetheless, it is worth noting that the side arms 170 extend downward and are also generally vertically oriented, thereby contributing to the longitudinally compact nature of the storage orientation. The front legs 158 are also now further retracted longitudinally inward to a more upright position. As a result, the front wheel assemblies 108 are positioned sufficiently rearward so as to overlap with the rear wheels 106 as shown. To that end, the rear wheels 106 are spaced sufficiently apart to allow the front wheel assemblies 108 room to retract between the rear wheels 106. With the front wheel assemblies 108 and the rear wheels 106 overlapping, the folded orientation of the stroller 100 is essentially retracted longitudinally to a minimum length given that the stroller 100 can remain standing upright while folded, as described below.

The upper tube 114 of the seat frame 110 may be further rotated about the pivotal seat joints 134 and 136 (FIG. 2) to a position in which the upper tube 114 is folded over to extend downward. The upper tube 114 may be rotated to an extent that the upper tube 114 is in contact with the lower tube 128 of the seat frame 114. As a result, the upper tube 114 may be disposed in parallel with the lower tube 112 as shown. More generally, both the lower and upper tubes 112 and 114 of the seat frame 110 may be vertically oriented for a more compact arrangement.

The lower tube 112 of the seat frame 110 may also rotate about the seat joints 134 and 136 to reach the folded orientation shown in FIG. 14. For example, the rotation may occur as a result of contact with the upper tube 114, after which the tubes 112 and 114 rotate together to respective fully folded positions. More generally, the position of the lower tube 112 may be released from a locked or secured engagement as a result of the rotation of the upper tube 114 past a threshold position. Alternatively or additionally, the lower tube 112 may be spring- or otherwise biased to an operational position from which displacement occurs during the folding sequence. The displacement may be driven or permitted by the rotation of the upper tube 114, or the retraction of the front legs 158, or both. In any event, the rotation of the lower tube 112 may be facilitated by the inward retraction of the front legs 158, thereby leading to a longitudinally compact folded orientation. The inward retraction of the front legs 158, in turn, is brought about via further tilting of the frame chassis 132, as shown via the increased tilt of the support post 146 relative to the position shown in FIG. 13.

The stroller 100 may include one or more lock-and-release mechanisms (not shown) to retain the folded orientation shown in FIG. 14. For example, a clip, bracket or other fastener may engage the handle 166, one or both of the seat tubes 112, 114 or some other component reoriented during the folding sequence. The mechanism may be useful in connection with embodiments in which one or more of the reoriented components are spring- or otherwise biased toward an operational orientation (or away from the folded orientation shown). The mechanism may also be useful in connection with transporting the stroller 100 while disposed in the folded orientation.

The folded orientation depicted in FIG. 14 is well-suited for transport or storage of the stroller 100 for several reasons. As described above, the longitudinal retraction and folding results in a more compact arrangement. The retraction and folding also lead to a stroller orientation in which the stroller 100 can rest in the standing position shown. Specifically, the front wheel assemblies 108 and the rear wheels 106, while overlapping, remain sufficiently positioned fore and aft in the folded orientation such that the stroller 100 can remain standing upright while folded. To that end, the stroller 100 has a sufficiently balanced longitudinal weight distribution in the folded orientation to maintain the upright, standing orientation. Moreover, the full inward retraction of the front wheel assemblies 108 and the rear wheels 106 as described above leads to an upright orientation in which the rear and front wheels 106 and 109 are arranged to meet the ground surface at the same level. The respective diameters of the wheels 106 and 109, as well as the respective lengths of the frame legs 158 and 160, may be selected to this end.

Figure 15:
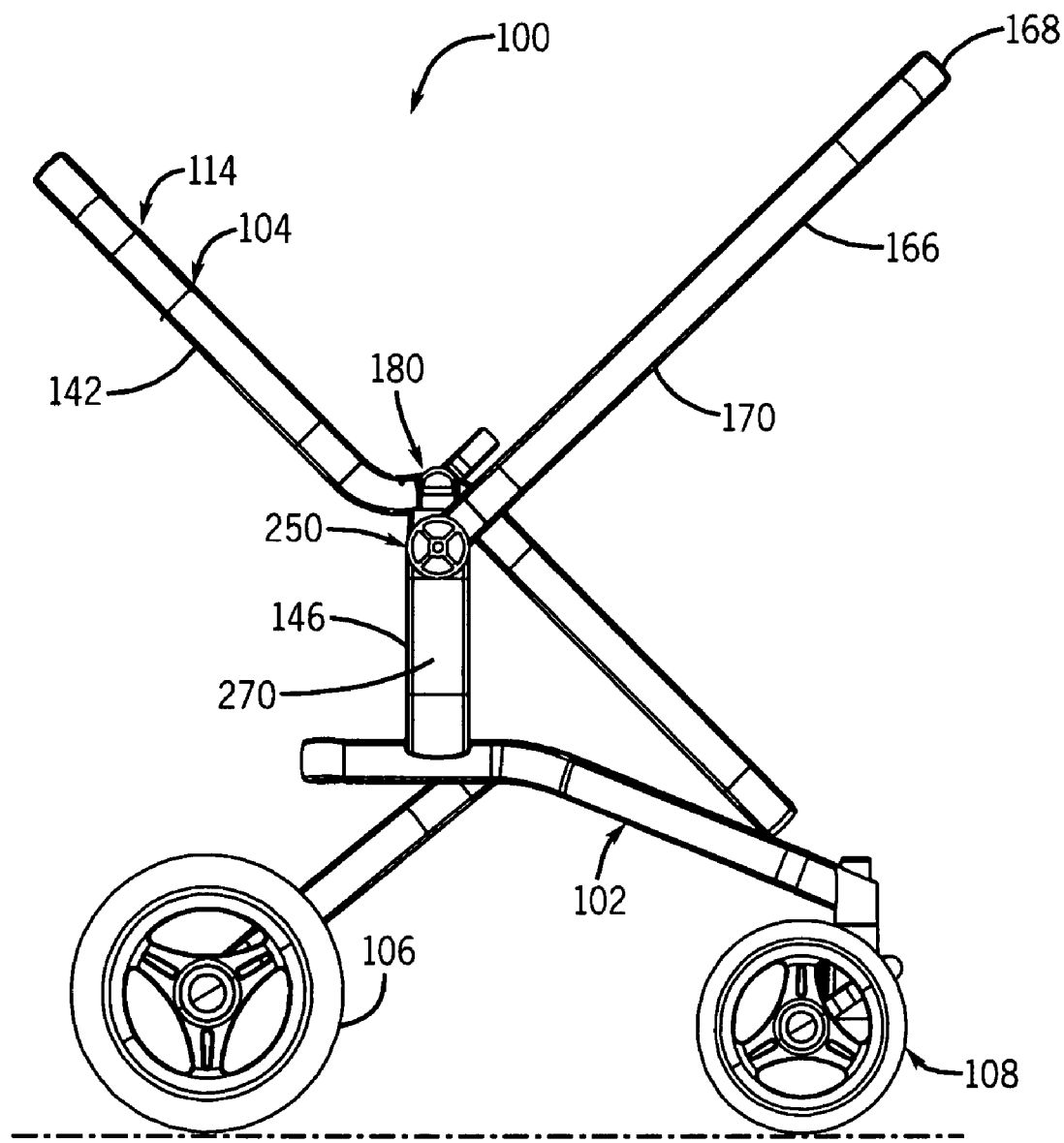
FIG. 15 is yet another side, elevational view of the stroller of FIG. 9 with the adjustable handle disposed in a forward position reversed from the rearward position shown in FIG. 9.

With reference now to FIG. 15, the stroller 100 is depicted in an in-use orientation in which the handle 166 is disposed in a reversed, operational position. Among other advantages, the reversed position of the handle 166 presents a caregiver with the option of maneuvering the stroller 100 from a position well-suited for monitoring the seat occupant. For example, the caregiver may stand between or near the front wheel assemblies 108 to face the seat assembly 104.

The position of the handle 166 may be adjusted from the rear position depicted in FIG. 11 to the front position of FIG. 15 via the handle pivot joints 250 and 252. To this end, the handle 166 may be rotated about the pivot joints 250 and 252 using, for example, the gear mechanism and lock mechanism addressed with regard to FIG. 11 in connection with adjustments to the height or inclination angle of the handle 166. More generally, the positioning of the handle 166 may be adjusted from the front orientation in the same manner in which height or inclination angle adjustments are made from the rear, in-use orientation, as described above.

The handle 166 is sized or arranged to clear the seat assembly 104 during the adjustment between the rear and front orientations. In this case, the arch-shaped end 168 is configured such that the handle 166 is wider than the seat assembly 104 and, more specifically, wider than the upper tube 114 of the seat frame 110. During the adjustment, the side arms 170 of the handle 166 also pass by the inner post assemblies 180 and other components extending upward from the support posts 146 and 148 (FIG. 9). To this end, the handle joints 250 and 252 (FIG. 9) from which the side arms 170 extend are disposed on outward faces 270 of the support posts 146 and 148, as best shown in FIG. 9. For these and other reasons, the frame assembly 102 and other components of the stroller 100 need not be re-positioned or re-oriented during an adjustment between the rear and front handle orientations.

In fact, the in-use or operational orientations depicted in FIGS. 11 and 15 are similar outside of the positioning of the handle 166. In either orientation, the front and rear legs 158 and 160 are generally oriented in an inverted V-shaped configuration. Other components of the frame assembly 102 are disposed in the positions described above as well.

For these reasons, a folding sequence that begins with the handle 166 disposed in the reverse position proceeds in a generally similar manner as the sequence described and shown in connection with FIGS. 12-14. The folding sequence may be initiated in the same manner as described above in connection with the other folding sequence.

Figure 16:
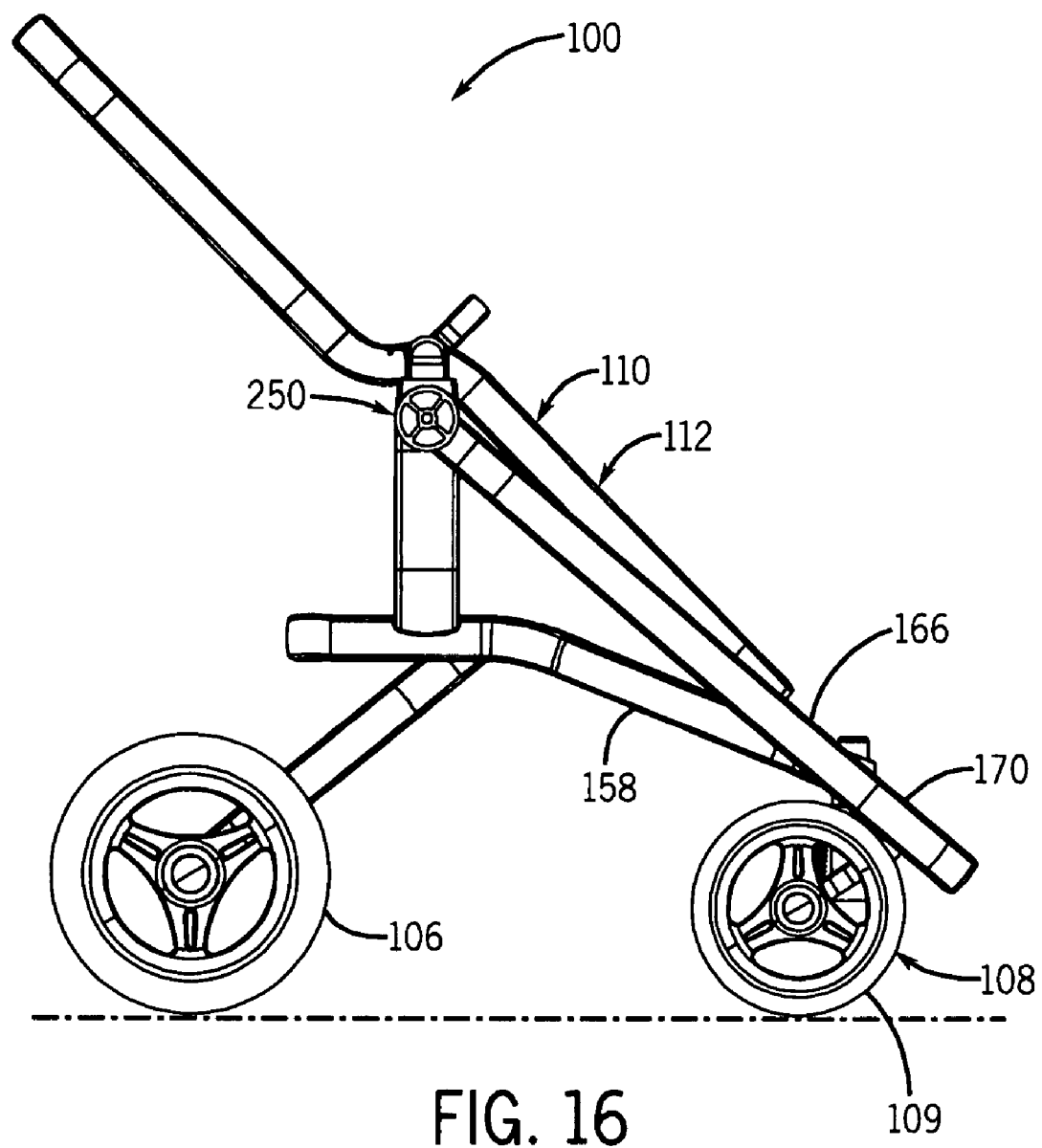
FIG. 16 is yet another side, elevational view of the stroller of FIG. 9 with the adjustable handle displaced from the forward position toward a further folded orientation of the stroller.

FIG. 16 depicts an intermediate arrangement in the folding sequence that may begin with the stroller 100 oriented in the reversed handle position. The folding sequence includes rotating or lowering the handle 166 to a lower, front position in which the side arms 170 slope downward in between the front wheel assemblies 108. At this point, the handle 166 may be rotated to an extent limited by one or more components of the wheel assemblies 108. In the exemplary case shown in FIG. 16, the side arms 170 may eventually be rotated until contact with the wheels 109. In other cases involving, for instance, a longer handle, the handle 166 may come to rest on the ground surface before contacting the wheel assemblies 108. More generally, this intermediate arrangement in the folding sequence may involve rotation until the side arms 170 of the handle 166 are generally aligned with, and adjacent to, the lower tube 112 of the seat frame 110. In some cases, the side arms 170 and the lower tube 112 are substantially parallel. In some cases, the relative positioning and alignment of the side arms 170 and the lower tube 112 remains the same throughout the folding sequence. Subsequent steps in the sequence are then directed to aligning (or increasing the alignment of) the side arms 170 and the lower tube 112 with other components of the frame assembly 102 for a more compact, upright folded orientation. For example, at this point in the folding sequence, the side arms 170 are not yet aligned with the front legs 158.

Figure 17:
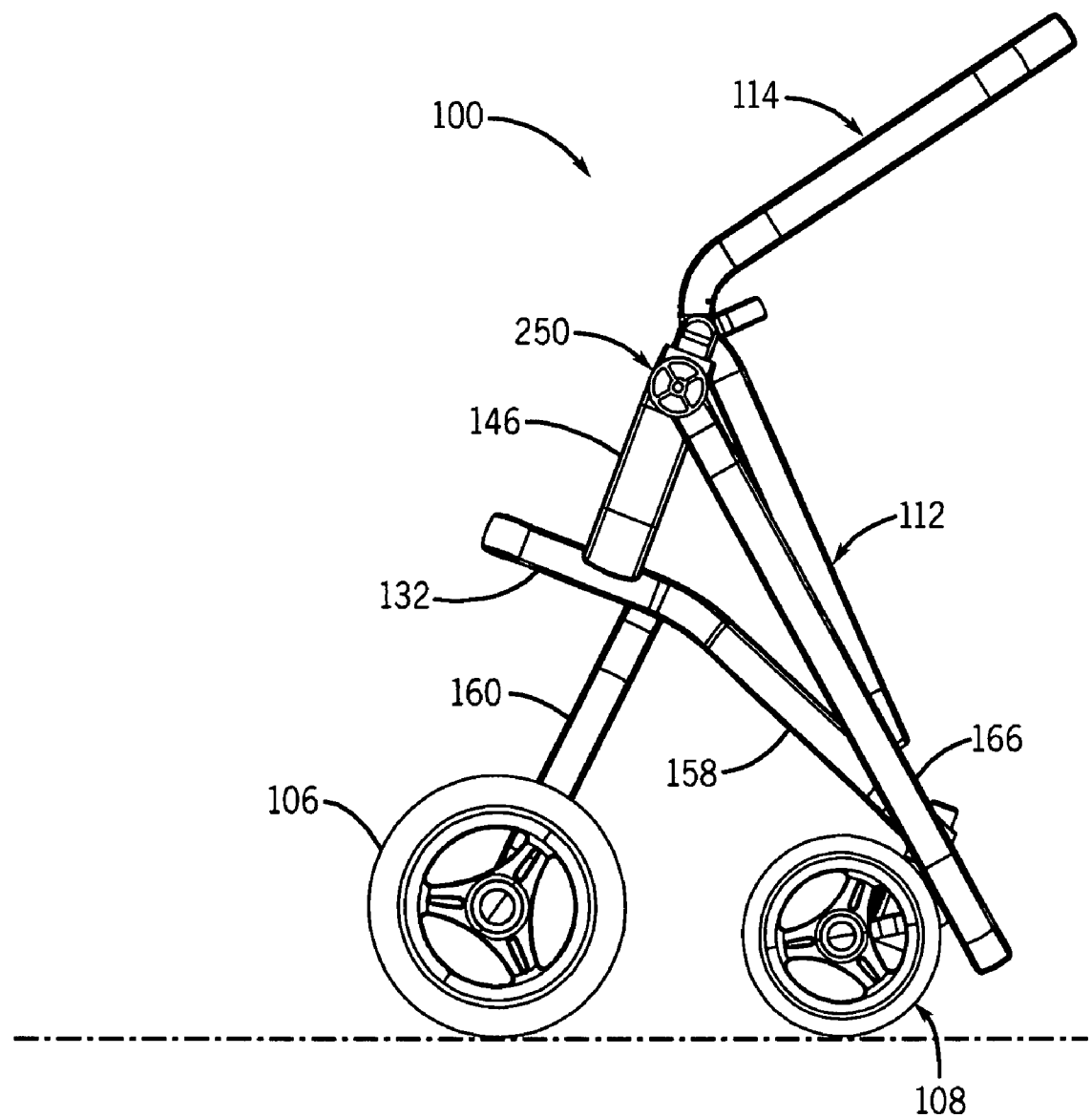
FIG. 17 is yet another side, elevational view of the stroller of FIG. 9 during further displacement toward the farther folded orientation of the stroller.
Figure 18:
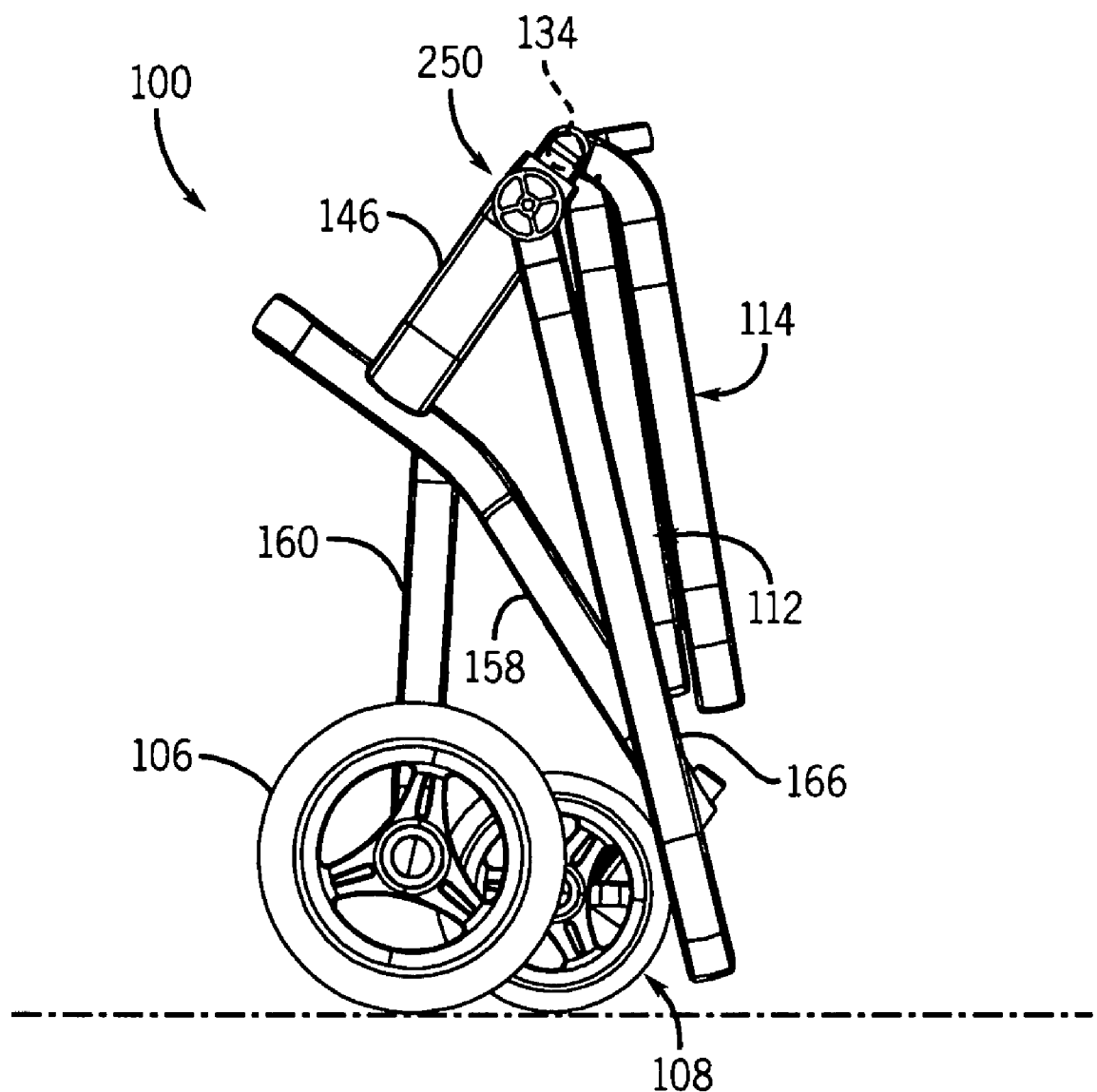
FIG. 18 is yet another side, elevational view of the stroller of FIG. 9 in the further folded orientation in which the stroller is inwardly retracted for disposition in another compact, upright and standing position.

FIGS. 17 and 18 depict two successive stages of the folding sequence in which other portions of the frame assembly 102 are rearranged toward a more compact, upright orientation. FIG. 17 shows the next step (or steps) in the folding sequence following the lowering of the handle 166. Specifically, the upper tube 114 of the seat frame 110 is rotated forward (clockwise) at the pair of rotational or pivotal seat joints 134 and 136 (FIG. 2), and the rear legs 160 are retracted longitudinally inward. These adjustments may be integrated to any desired extent, such that movement of, for example, the rear legs 160 is enabled by or otherwise linked to the movement of the upper tube 114 in a forward direction as shown. Similarly, these adjustments may be triggered or enabled by the movement of the handle 166 to its lowest position, or via the passing of some other predetermined threshold position. In either case, further movements by the caregiver of the triggering component may result in release or movement of the other components involved in the folding sequence.

The inward retraction of the rear legs 160 begins a rearrangement of the stroller 100 into a more compact orientation similar to the orientation described above with the handle 166 disposed in a rear position. Generally speaking, the handle 166 is increasingly aligned with components of the frame assembly 102. In this case, the front legs 158 are tilted toward a more upright position for increased alignment and adjacency with the handle 166. The tilting of the front legs 158 may be enabled, triggered or otherwise initiated in a manner to that described above in connection with the alternative folding sequence. For example, and as described above, the inward retraction of the rear legs 160 may result in a forward tilting of the frame chassis 132, including the front legs 158.

The folding sequence may modify the position of the front wheel assemblies 108 relative to the rear wheels 106 in the same manner as shown and described with the handle 166 in the rear position. That is, both the front wheel assemblies 108 and the rear wheels 106 are longitudinally retracted inward toward one another. As the front wheel assemblies 108 and the rear wheels 106 approach one another, the components of the frame assembly 102 become increasingly vertically oriented, such that the stroller 100 becomes increasingly upright and longitudinally compact.

FIG. 18 depicts the final configuration of the folding sequence and, thus, another exemplary folded orientation of the stroller suitable for storage, portability, etc. In this orientation, the handle 166 is lowered to a front storage position that may involve further rotation beyond the position depicted in FIG. 17. For example, the handle 166, the front legs 158, and the rear legs 160 may become increasingly vertically oriented to remain generally aligned for a longitudinally compact arrangement. To this end, the rear legs 160 have been further retracted longitudinally inward to an extent that, in this exemplary case, the rear wheels 106 are contacting the front wheel assemblies 108. Specifically, the rear legs 160 are now more vertically oriented than the side arms 170 of the handle 166. The front legs 158 are also now further retracted longitudinally inward to a more upright position. As a result, the front wheel assemblies 108 are positioned sufficiently rearward so as to overlap with the rear wheels 106 as shown. To that end, the rear wheels 106 are spaced sufficiently apart to allow the front wheel assemblies 108 room to retract between the rear wheels 106. With the front wheel assemblies 108 and the rear wheels 106 retracted to the extent shown, the folded orientation of the stroller 100 is longitudinally compact.

The upper tube 114 of the seat frame 110 is further rotated about the pivotal seat joints 134 and 136 (FIG. 2) to a position in which the upper tube 114 is folded over to extend downward. The upper tube 114 may be rotated to an extent that the upper tube 114 is in contact with the lower tube 112 of the seat frame 110. As a result, the upper tube 114 may be disposed in parallel with the lower tube 112 as shown. More generally, the lower and upper tubes 112 and 114 of the seat frame 110 may be vertically oriented for a more compact arrangement. In these and other respects, the folded orientation shown in FIG. 18 is identical to the folded orientation with the rear-positioned handle shown in FIG. 14.

The lower tube 112 of the seat frame 110 may also rotate about the seat joints 134 and 136 to reach the folded orientation shown in FIG. 18. The manner in which the rotation proceeds may be similar to that described above in connection with the folding sequence leading to the orientation shown in FIG. 14. For example, the rotation may occur as a result of contact with the upper tube 114, after which the tubes 112 and 114 rotate together to respective fully folded positions. More generally, the position of the lower tube 112 may be released from a locked or secured engagement as a result of the rotation of the upper tube 114 past a threshold position.

The stroller 100 may include one or more lock-and-release mechanisms (not shown) to retain the folded orientation shown in FIG. 18. For example, a clip, bracket or other fastener may engage the handle 166, one or both of the seat tubes 112, 114 or some other component reoriented during the folding sequence. The same mechanism may be used to maintain the folded orientations of both FIGS. 14 and 18.

The folded orientation depicted in FIG. 18 is well-suited for transport or storage of the stroller 100 for the same reasons described above in connection with the other folded orientation. For example, the front wheel assemblies 108 and the rear wheels 106 are positioned fore and aft in the folded orientation such that the stroller 100 has a sufficiently balanced longitudinal weight distribution to maintain an upright, standing orientation.

Although certain strollers have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A stroller comprising:
   a base frame having a frame leg and a frame joint to which the frame leg is coupled, the frame joint being configured to allow retraction of the frame leg to a folded position for a folded storage orientation of the stroller;
   a seat frame supported by the base frame;
   a pair of frame posts that extend upward from the frame leg to couple the seat frame to the base frame; and
   a handle attached to the frame posts at a respective pivot joint on each frame post, the pivot joints being configured for rotation of the handle between a first operational orientation in which the handle is positioned rearward of the pivot joint and a second operational orientation in which the handle is positioned forward of the pivot joint;
   wherein the pivot joint is further configured for further rotation of the handle from either the first operational orientation or the second operational orientation to a folded storage position aligned with the folded position of the frame leg when the stroller is in the folded storage orientation, and
   wherein the frame leg is fixedly coupled to the frame joint, and wherein the base frame comprises a further frame leg rotatably coupled to the frame joint and configured such that rotation of the further frame leg tilts the base frame for the retraction of the first-named frame leg toward the folded position.

2. The stroller of claim 1, wherein the seat frame has upper and lower seat frame attachment tubes, each extending from a pair of seat pivot joints supported by the pair of frame posts, respectively, and wherein the upper and lower seat attachment tubes are configured to rotate about the seat pivot joints to respective, generally vertical positions.

3. The stroller of claim 1, wherein the frame leg rotates about the frame joint.

4. The stroller of claim 1, wherein the first-named frame leg and the further frame leg are generally vertically oriented when the first-named frame leg is disposed in the folded position such that the stroller is capable of standing upright upon the first-named and further named frame legs when the first-named frame leg is disposed in the folded position.

5. The stroller of claim 1, wherein each frame post is upright in the first and second operational orientations and tilted in the folded storage orientation.

6. The stroller of claim 1, wherein the handle is secured to the frame posts near a top end of each frame post.

7. A stroller having first and second folded storage orientations, the stroller comprising:
front and rear wheels;
a base frame having a front frame leg and a rear frame leg coupled to the front and rear wheels, respectively;
a seat frame supported by the base frame;
a pair of frame posts that extend upward from the base frame to couple the seat frame to the base frame; and
a handle attached to the frame posts at a respective pivot joint on each frame post, the pivot joints being configured for rotation of the handle to a first upright storage position in which the handle is disposed forward of the pivot joint and a second upright storage position in which the handle is disposed rearward of the pivot joint, the handle being disposed in the first and second positions when the stroller is in the first and second folded storage orientations, respectively;
a frame joint to which the front frame leg and the rear frame leg are coupled, the frame joint being configured to allow the front frame leg and the rear frame leg to pivot inward toward one another to retract the front and rear wheels to respective folded positions for the first and second folded storage orientations;
wherein the stroller is supported by the front and rear frame legs to stand upright upon the front and rear wheels in both the first folded storage orientation and the second folded storage orientation.

8. The stroller of claim 7, wherein the pivot joints are further configured for further rotation of the handle to a first operational orientation in which the handle is positioned rearward of the pivot joint and to a second operational orientation in which the handle is positioned forward of the pivot joint.

9. The stroller of claim 7, wherein the handle is generally oriented in a vertical direction in both the first and second upright storage positions.

10. The stroller of claim 9, wherein the handle extends downward from the pivot joints in the first and second upright storage positions.

11. The stroller of claim 7, wherein the respective folded positions orient the front and rear frame legs in generally vertical directions.

12. The stroller of claim 7, wherein the front and rear frame legs are retracted in a longitudinal direction.

13. The stroller of claim 7, wherein the seat frame has upper and lower seat frame attachment tubes, each extending from a pair of seat pivot joints supported by the pair of frame posts, respectively, and wherein the upper and lower seat attachment tubes are configured to rotate about the seat pivot joints to respective, generally vertical positions.

14. The stroller of claim 7, wherein the rear frame leg rotates about the frame joint.

15. The stroller of claim 14, wherein the front frame leg is fixedly coupled to the frame joint such that rotation of the rear frame leg tilts the base frame for retraction of the front frame leg toward the respective folded position.

16. The stroller of claim 7, wherein each frame post is upright in an operational orientation of the stroller and tilted in the first and second folded storage orientations.

17. The stroller of claim 7, wherein the handle is secured to the frame posts near a top end of each frame post.

18. A stroller comprising:
a base frame adapted for reconfiguration between an in-use orientation and a folded storage orientation;
a seat frame supported by the base frame;
a pair of frame posts that extend upward from the base frame to couple the seat frame to the base frame; and
a handle attached to the frame posts at a respective pivot joint on each frame post, the pivot joints being configured for rotation of the handle while the base frame is in the in-use orientation between a first operational position in which the handle is positioned rearward of the pivot joint and a second operational position in which the handle is positioned forward of the pivot joint;
wherein the pivot joints are further configured for further rotation of the handle in connection with the folded storage orientation of the base frame to a first folded storage position in which the handle is disposed forward of the pivot joint and to a second folded storage position in which the handle is disposed rearward of the pivot joint, and
wherein the handle is adjacent the base frame in both the first and second folded storage positions.

19. The stroller of claim 18, wherein each frame post is upright in the in-use orientation and tilted in the folded storage orientation.

20. The stroller of claim 18, wherein the handle is secured to the frame posts near a top end of each frame post.

21. A stroller comprising:
a base frame having a frame leg and a frame joint to which the frame leg is coupled, the frame joint being configured to allow retraction of the frame leg to a folded position for a folded storage orientation of the stroller;
front and rear wheels upon which the base frame rests during use and upon which the stroller stands upright after the retraction to the folded storage orientation
a seat frame supported by the base frame;
a pair of frame posts that extend upward from the frame leg to couple the seat frame to the base frame; and
a handle attached to the frame posts at a respective pivot joint on each frame post, the pivot joints being configured for rotation of the handle between a first operational orientation in which the handle is positioned rearward of the pivot joint and a second operational orientation in which the handle is positioned forward of the pivot joint;
wherein the pivot joint is further configured for further rotation of the handle from either the first operational orientation or the second operational orientation to a folded storage position aligned with the folded position of the frame leg when the stroller is in the folded storage orientation.

22. The stroller of claim 21, wherein the frame leg is oriented in a generally vertical direction when the stroller is in the folded storage orientation.

23. The stroller of claim 21, wherein the handle is oriented in a generally vertical direction when the stroller is in the folded storage orientation.

24. The stroller of claim 21, wherein the handle extends downward from the pivot joints when the stroller is in the folded storage orientation.

25. The stroller of claim 21, wherein the retraction of the frame leg retracts the front and rear wheels inwardly toward one another in a longitudinal direction.

26. A stroller having first and second folded storage orientations, the stroller comprising:
   a base frame having a front frame leg and a rear frame leg;
   a seat frame supported by the base frame;
   a pair of frame posts that extend upward from the base frame to couple the seat frame to the base frame; and
   a handle attached to the frame posts at a respective pivot joint on each frame post, the pivot joints being configured for rotation of the handle to a first upright storage position in which the handle is disposed forward of the pivot joint and a second upright storage position in which the handle is disposed rearward of the pivot joint, the handle being disposed in the first and second positions when the stroller is in the first and second folded storage orientations, respectively;
   a frame joint to which the front frame leg and the rear frame leg are coupled, the frame joint being configured to allow the front frame leg and the rear frame leg to retract to respective folded positions for the first and second folded storage orientations;
   wherein the stroller is supported by the front and rear frame legs to stand upright in both the first folded storage orientation and the second folded storage orientation,
   wherein the handle is generally oriented in a vertical direction in both the first and second upright storage positions, and
   wherein the handle extends downward from the pivot joints in the first and second upright storage positions.

27. A stroller having first and second folded storage orientations, the stroller comprising:
   a base frame having a front frame leg and a rear frame leg;
   a seat frame supported by the base frame;
   a pair of frame posts that extend upward from the base frame to couple the seat frame to the base frame; and
   a handle attached to the frame posts at a respective pivot joint on each frame post, the pivot joints being configured for rotation of the handle to a first upright storage position in which the handle is disposed forward of the pivot joint and a second upright storage position in which the handle is disposed rearward of the pivot joint, the handle being disposed in the first and second positions when the stroller is in the first and second folded storage orientations, respectively;
   a frame joint to which the front frame leg and the rear frame leg are coupled, the frame joint being configured to allow the front frame leg and the rear frame leg to retract to respective folded positions for the first and second folded storage orientations;
   wherein the stroller is supported by the front and rear frame legs to stand upright in both the first folded storage orientation and the second folded storage orientation,
   wherein the rear frame leg rotates about the frame joint, and
   wherein the front frame leg is fixedly coupled to the frame joint such that rotation of the rear frame leg tilts the base frame for retraction of the front frame leg toward the respective folded position.

* * * * *